(12) United States Patent
Banerjee et al.

(10) Patent No.: US 11,608,428 B2
(45) Date of Patent: Mar. 21, 2023

(54) THERMOCHROMIC COMPOSITIONS, THERMOCHROMIC SUBSTRATES, AND RELATED METHODS OF MAKING

(71) Applicant: THE TEXAS A&M UNIVERSITY SYSTEM, College Station, TX (US)

(72) Inventors: Sarbajit Banerjee, College Station, TX (US); Kate E. Pelcher, College Station, TX (US); Nathan A. Fleer, College Station, TX (US); Diane G. Sellers, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 261 days.

(21) Appl. No.: 16/625,570

(22) PCT Filed: Jun. 28, 2018

(86) PCT No.: PCT/US2018/040071
§ 371 (c)(1),
(2) Date: Dec. 20, 2019

(87) PCT Pub. No.: WO2019/006154
PCT Pub. Date: Jan. 3, 2019

(65) Prior Publication Data
US 2021/0403681 A1    Dec. 30, 2021

Related U.S. Application Data

(60) Provisional application No. 62/526,240, filed on Jun. 28, 2017.

(51) Int. Cl.
*C08K 9/06* (2006.01)
*C03C 17/00* (2006.01)
(Continued)

(52) U.S. Cl.
CPC .............. *C08K 9/06* (2013.01); *C03C 17/007* (2013.01); *C03C 17/009* (2013.01); *C03C 17/32* (2013.01);
(Continued)

(58) Field of Classification Search
None
See application file for complete search history.

(56) References Cited

U.S. PATENT DOCUMENTS 7,460,289 B2 *  12/2008  Pichot .................... G02F 1/155
                                                 359/266
2013/0344335 A1    12/2013  Gao et al.
2015/0132494 A1 *   5/2015  Luo ........................ C01G 31/02
                                                 549/208

FOREIGN PATENT DOCUMENTS

WO    2016052720 A1    4/2016

OTHER PUBLICATIONS

International Preliminary Report on Patentability and Written Opinion dated Dec. 31, 2019, issued in International Application No. PCT/US2018/040071, filed Jun. 28, 2018, 9 pages.
(Continued)

*Primary Examiner* — Jeffrey D Washville
(74) *Attorney, Agent, or Firm* — Christensen O'Connor Johnson Kindness PLLC

(57) ABSTRACT

Vanadium oxide nanomaterials dispersed in a polymeric matrix, substrates including the vanadium oxide nanomaterials dispersed in a polymeric matrix, and related methods of making vanadium oxide nanomaterials dispersed in a polymeric matrix are described.

32 Claims, 18 Drawing Sheets

(51) Int. Cl.
*C03C 17/32* (2006.01)
*C08J 5/18* (2006.01)
*C08K 3/22* (2006.01)
*C08K 9/02* (2006.01)
*C09C 3/00* (2006.01)
*C09C 3/04* (2006.01)
*C09C 3/06* (2006.01)
*C09C 3/12* (2006.01)
*G02B 1/02* (2006.01)
*G02B 1/04* (2006.01)
*G02B 5/20* (2006.01)

(52) U.S. Cl.
CPC *C08J 5/18* (2013.01); *C08K 3/22* (2013.01); *C08K 9/02* (2013.01); *C09C 3/006* (2013.01); *C09C 3/04* (2013.01); *C09C 3/063* (2013.01); *C09C 3/12* (2013.01); *G02B 1/02* (2013.01); *G02B 1/04* (2013.01); *G02B 5/208* (2013.01); *C01P 2002/72* (2013.01); *C01P 2002/82* (2013.01); *C01P 2002/85* (2013.01); *C01P 2002/88* (2013.01); *C01P 2004/04* (2013.01); *C01P 2004/64* (2013.01); *C01P 2004/84* (2013.01); *C03C 2217/445* (2013.01); *C03C 2217/475* (2013.01); *C03C 2217/48* (2013.01); *C03C 2218/114* (2013.01); *C08K 2201/011* (2013.01)

(56) References Cited

OTHER PUBLICATIONS

International Search Report dated Sep. 27, 2018, issued in International Application No. PCT/US2018/040071, filed Jun. 28, 2018, 3 pages.
Written Opinion dated Sep. 27, 2018, for International Application No. PCT/US2018/040071. (7 pages).
Gao, Yanfeng et al., "Enhanced chemical stability of VO2 nanoparticles by the formation of SiO2/VO2 core/shell structures and the application to transparent and flexible VO2-based composite foils with excellent thermochromic properties for solar heat control," Energy & Environmental Science, 5:6104-6110, Feb. 1, 2012.

\* cited by examiner

THERMOCHROMIC COMPOSITIONS, THERMOCHROMIC SUBSTRATES, AND RELATED METHODS OF MAKING

BACKGROUND

Burgeoning construction worldwide, both in the form of residential dwellings and commercial structures, have led to buildings becoming a major source of energy consumption, a trend that has only been accelerated by rapid urbanization in the developing world. A recent report from the United Nations estimates that 30-40% of primary energy usage across the world occurs within buildings. In the United States, the Department of Energy estimates that 41% of the total energy consumption occurs within buildings. Much of the energy consumed within buildings goes towards space cooling, space heating, lighting, and ventilation. The inability of the built environment to interface with the natural environment in terms of climate control not only leads to increased energy costs, but also incurs a tremendous cost in terms of $CO_2$ emissions. Consequently, the building envelope, which is literally the barrier that separates the interior of a building from the exterior environment, is a target area for improvement in order to achieve the ideal of "net zero" buildings. Fenestration elements are a significant venue through which solar irradiance can enter the building and indeed mitigating solar heat gain is the primary objective in the summer or during warm days, whereas in the winter or during cold days, utilizing the solar heat gain to reduce heating costs is desirable.

Many current technologies aimed at addressing this problem, most of which are coatings and films, suffer from major drawbacks, including a reduction in the transmission of visible light, thereby leading to increased use of artificial lighting, and, because these technologies are static across all temperatures, an elimination of the offset in wintertime heating costs that would otherwise be provided due to solar heat gain. Dynamically switchable temperature- or voltage-responsive glazing could play an active role in modulating solar heat gain through fenestration elements and indeed numerous electrochromic and thermochromic technologies have been evaluated for this purpose in recent years.

However, there exists only a relatively sparse set of compounds characterized by large thermally induced modulations of electrical conductance; such electronic phase transitions are underpinned typically by either electron correlation or electron-phonon coupling. Further, integration of thermochromic components into fenestration elements presents numerous challenges, including retaining high levels of visible light transmission through the fenestration element, mitigation of light scattering as it passes through the fenestration element, and physical integrity of the thermochromic components as they are thermally cycled.

Accordingly, there is presently a need for compositions and substrates for thermochromic modulation of NIR solar flux having high visible light transmission, low light scattering, and long-term physical integrity of thermochromic components. Further, there is need for scalable and environmentally benign methods of making such compositions and substrate. The present disclosure addresses these needs as well as provides additional related benefits.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure provides a method of making a crystalline vanadium oxide nanomaterial dispersed in a polymeric matrix generally including hydrothermally annealing amorphous vanadium oxide to provide a crystalline vanadium oxide nanomaterial; coating the crystalline vanadium oxide nanomaterial with a passivating layer; and dispersing the coated crystalline vanadium oxide nanomaterial in a polymeric matrix with the aid of a dispersant.

In another aspect, the present disclosure provides a composition generally including a polymeric matrix; and a crystalline vanadium oxide nanomaterial comprising: a crystalline vanadium oxide core; and a passivating layer coating at least a portion of the crystalline vanadium oxide core, wherein the crystalline vanadium oxide nanomaterial is dispersed in the polymeric matrix.

In another aspect, the present disclosure provides a substrate having a surface, wherein the surface comprises a film generally including a polymeric matrix; and a crystalline vanadium oxide nanomaterial comprising: a crystalline vanadium oxide core; and a passivating layer coating at least a portion of the crystalline vanadium oxide core, wherein the crystalline vanadium oxide nanomaterial is dispersed in the polymeric matrix.

DESCRIPTION OF THE DRAWINGS

The foregoing aspects and many of the attendant advantages of this claimed subject matter will become more readily appreciated as the same become better understood by reference to the following detailed description, when taken in conjunction with the accompanying drawings, wherein:

Figures 12A, 12B, 12C, 12D:
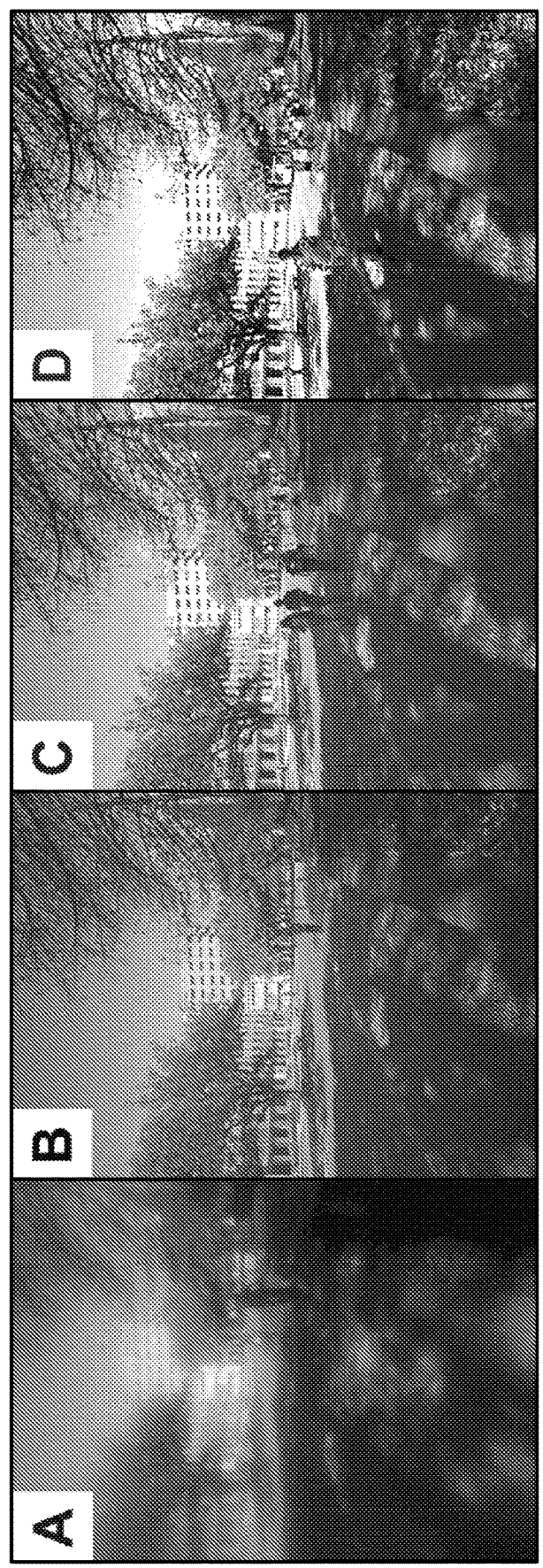
FIGS. 12A-12D are digital photographs acquired with illumination through solution-cast nanocomposite $VO_2$ thin films, where the film of FIG. 12A is a film including a crosslinked polyacrylic acid used as the thickener with a 6 mg loading of $VO_2$ nanocrystals, the film of FIG. 12B is a film including methacrylic acid/ethyl acrylate copolymer used as the matrix with a 6 mg loading of $VO_2$ nanocrystals (as shown the polymer matrix exhibits significantly decreased scattering), the film of FIG. 12C includes a methacrylic acid/ethyl acrylate copolymer with a 6 mg loading $VO_2@$-F nanocrystals with PFOS as a surfactant.
Figure 13B:
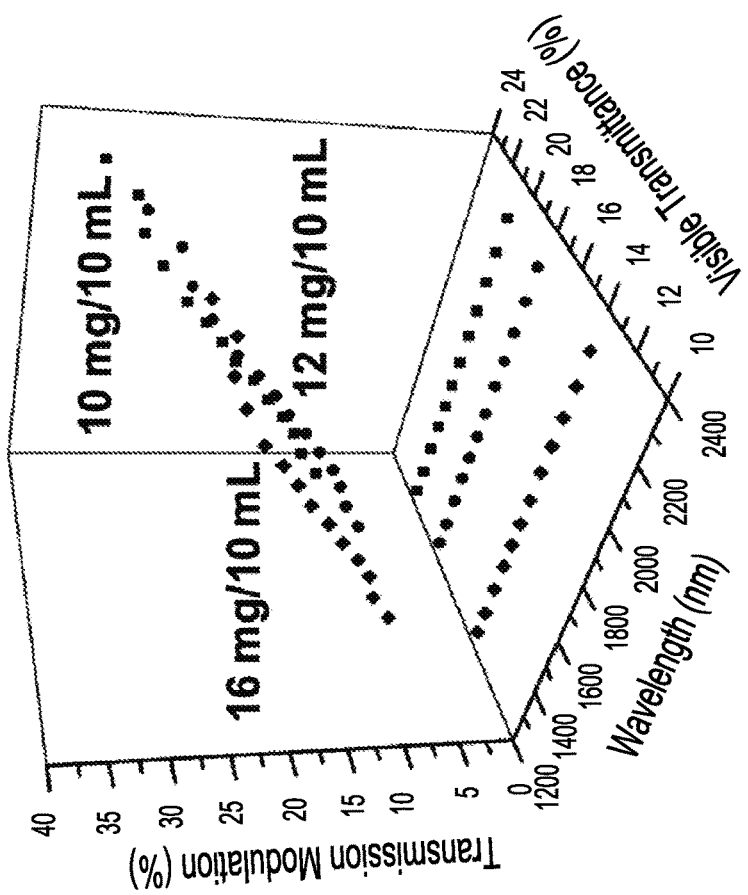
Figure 13A:
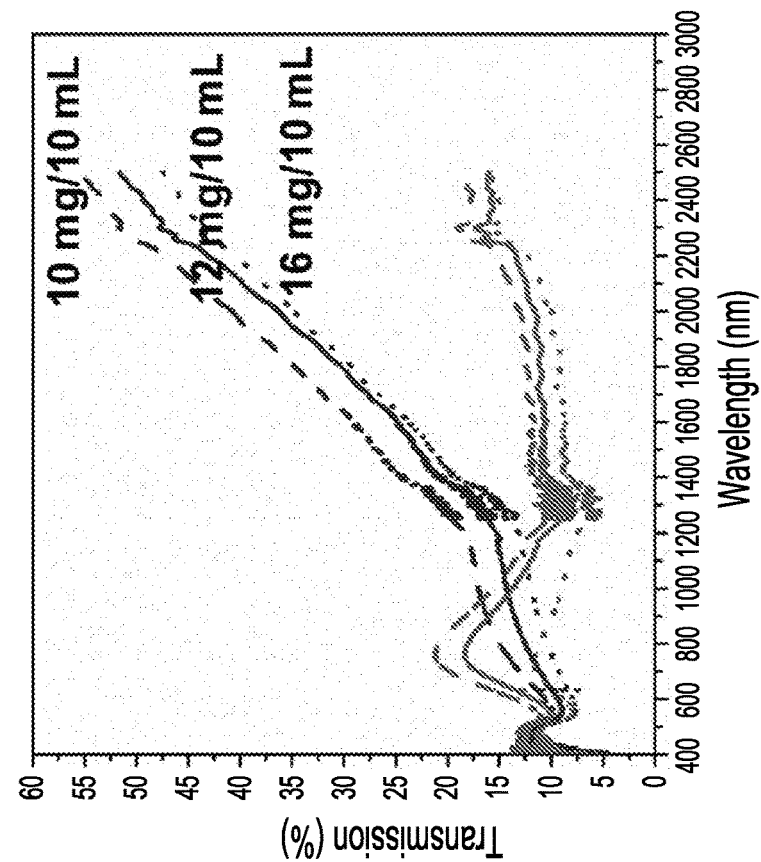
Figure 14B:
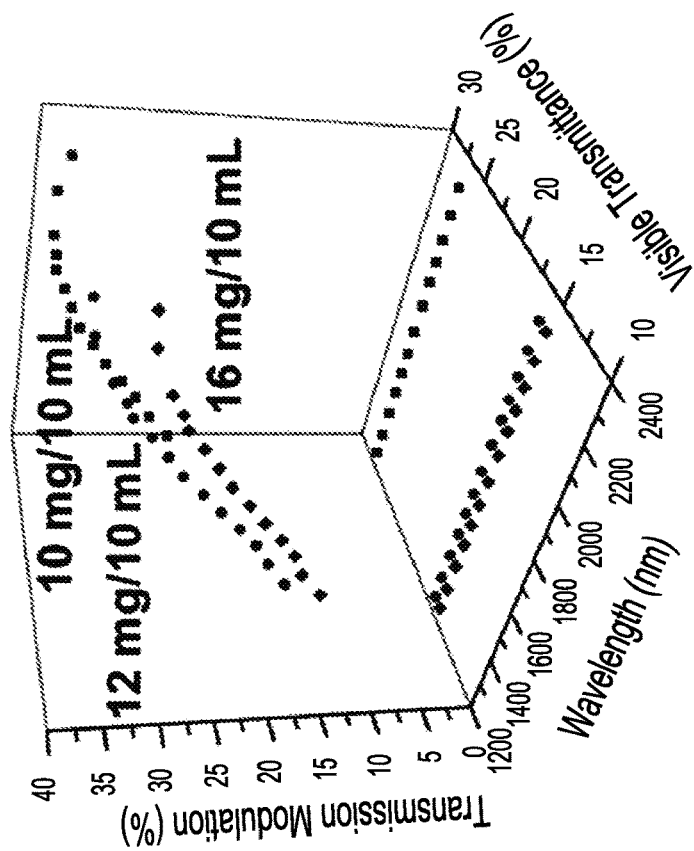
Figure 14A:
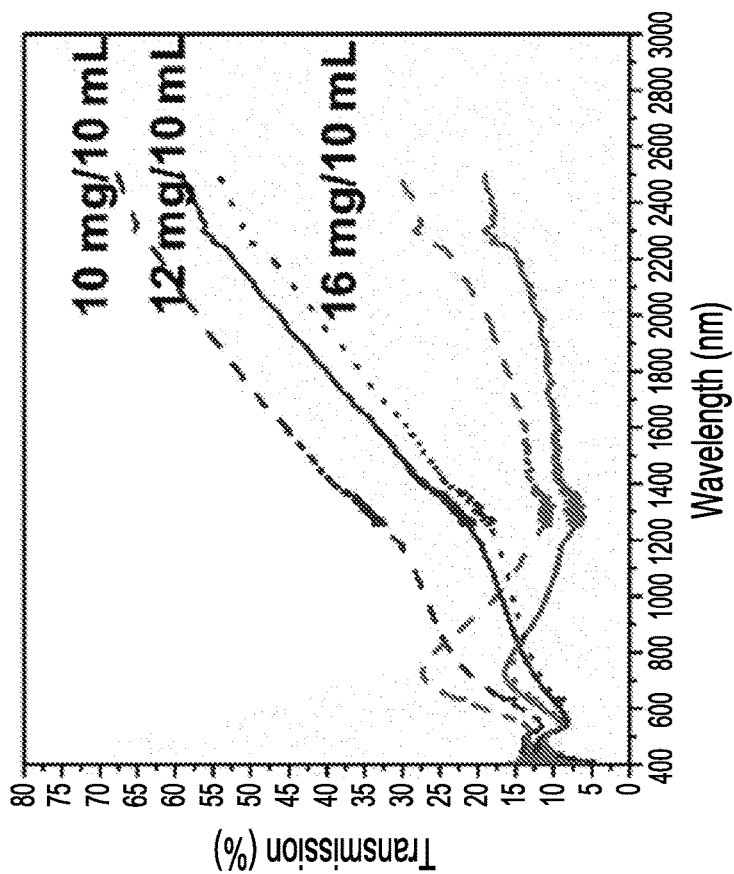
Figure 15B:
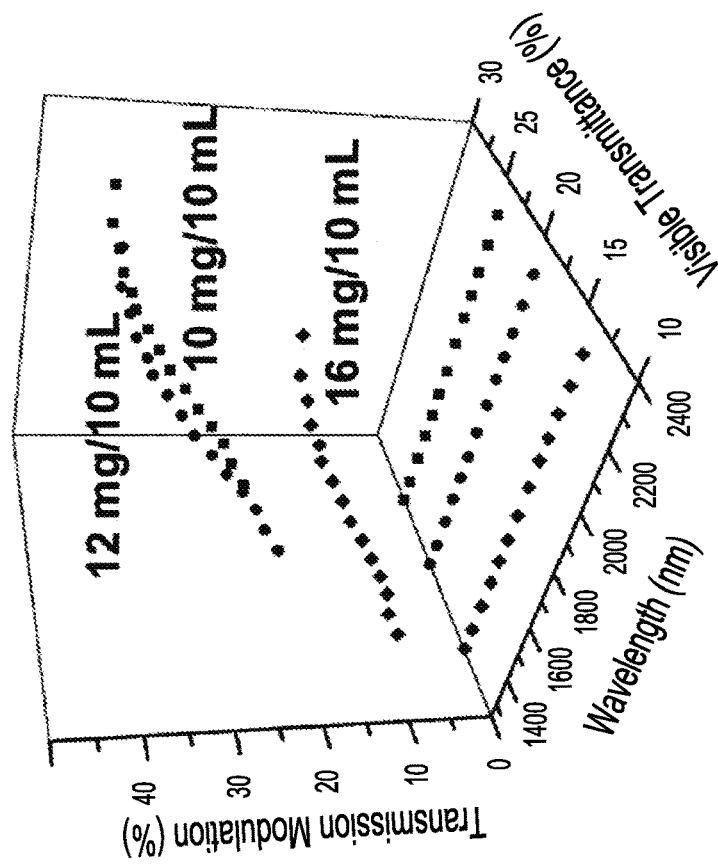
Figure 15A:
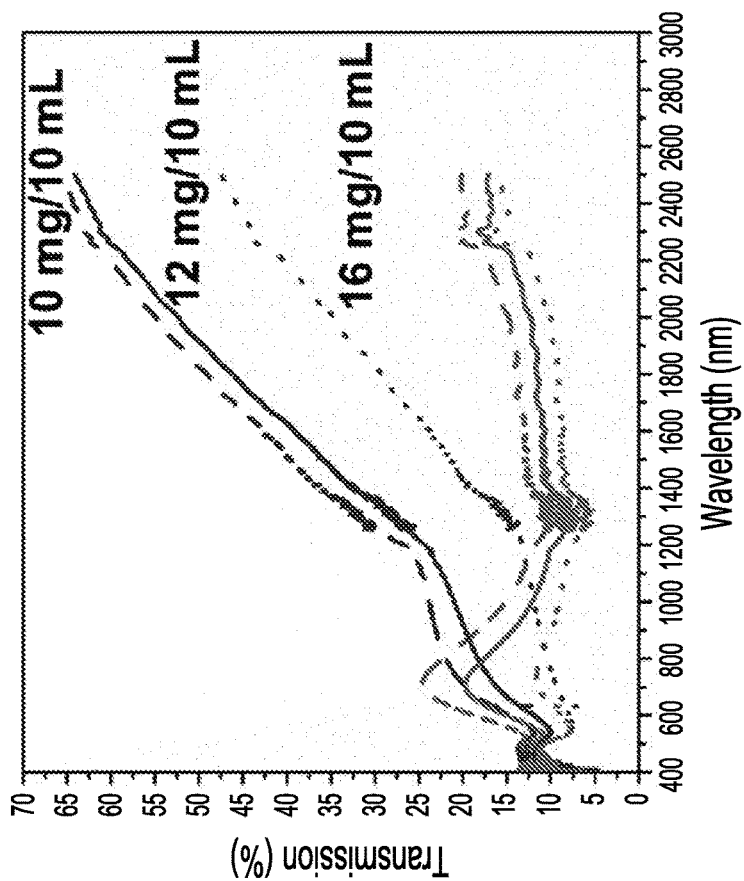
Figures 16A, 16B:
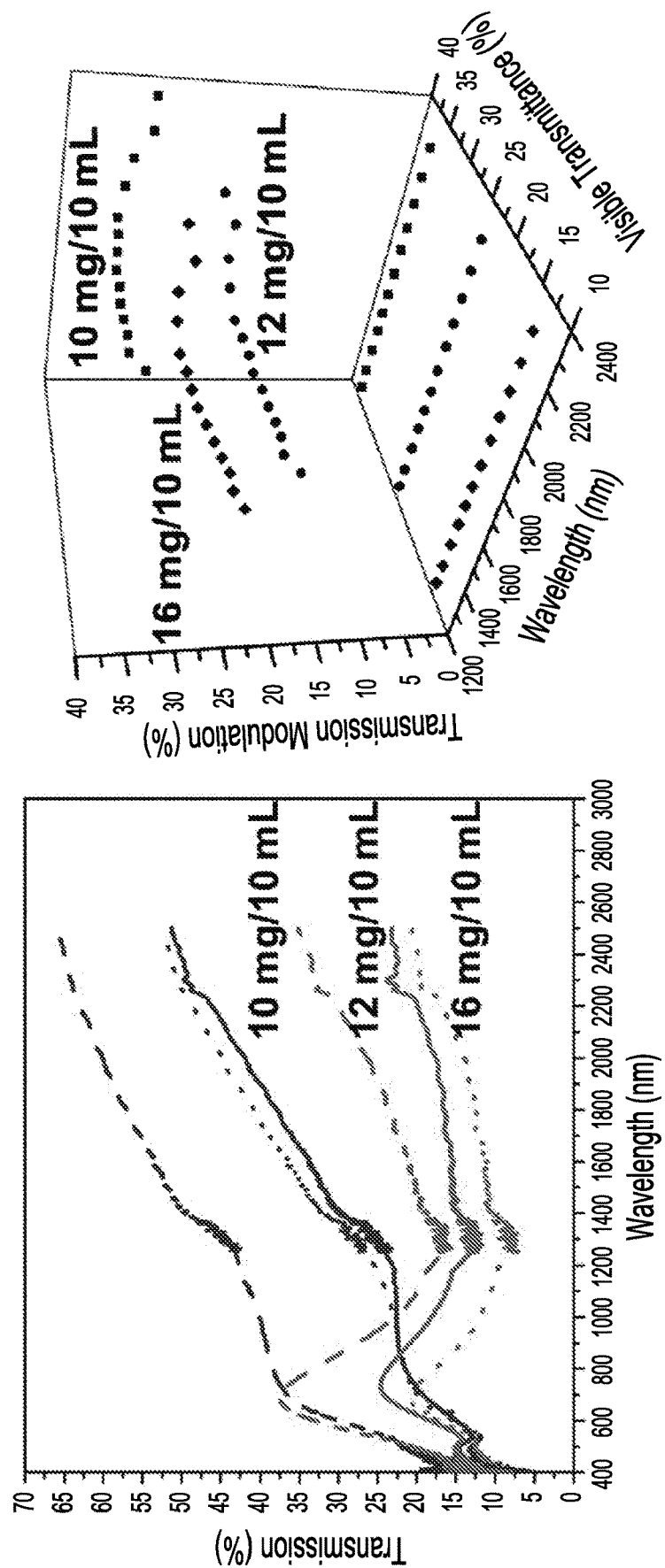

(as shown the scattering of visible light has been further reduced) and the image of FIG. 12D shows an uncoated borosilicate glass slide;

FIG. 13A is an absorption spectra acquired for three higher loadings of $VO_2$ nanocrystals in accordance with embodiments of the disclosure. The plots correspond to 10 mg (dashed lines), 12 mg (solid lines), and 16 mg (dotted lines) dispersed in 10 mL of an aqueous dispersion of 1 wt % (relative to 10 mL water mass) methacrylic acid/ethyl acrylate copolymer cast onto borosilicate glass. Spectra obtained at 30° C. are displayed in black, whereas spectra obtained at 85° C. after equilibration for 10 min are shown in gray;

FIG. 13B is a 3D representation of $VO_2$ optical data plots showing three nanocrystal loadings of the nanocrystals of FIG. 13A in accordance with an embodiment of the disclosure: 10 mg (squares), 12 mg (circles), and 16 mg (diamonds);

FIG. 14A is an absorption spectra acquired for three higher loadings of $VO_2$@-F nanocrystals in accordance with embodiments of the disclosure. The plots correspond to 10 mg (dashed lines), 12 mg (solid lines), and 16 mg (dotted lines) dispersed in 10 mL of an aqueous dispersion of 1 wt % (relative to 10 mL water mass) methacrylic acid/ethyl acrylate copolymer cast onto borosilicate glass. Spectra obtained at 30° C. are displayed in black, whereas spectra obtained at 85° C. after equilibration for 10 min are shown in gray;

FIG. 14B is a 3D representation of $VO_2$ optical data plots showing three nanocrystal loadings of the nanocrystals of FIG. 14A in accordance with an embodiment of the disclosure: 10 mg (squares), 12 mg (circles), and 16 mg (diamonds);

FIG. 15A is an absorption spectra acquired for three higher loadings of $VO_2$@$SiO_2$ nanocrystals in accordance with an embodiment of the disclosure. The plots correspond to 10 mg (dashed lines), 12 mg (solid lines), and 16 mg (dotted lines) dispersed in 10 mL of an aqueous dispersion of 1 wt % (relative to 10 mL water mass) methacrylic acid/ethyl acrylate copolymer cast onto borosilicate glass. Spectra obtained at 30° C. are displayed in black, whereas spectra obtained at 85° C. after equilibration for 10 min are shown in gray;

FIG. 15B is a 3D representation of $VO_2$ optical data plots showing three nanocrystal loadings of the nanocrystals of FIG. 15A in accordance with an embodiment of the disclosure: 10 mg (squares), 12 mg (circles), and 16 mg (diamonds);

FIG. 16A illustrates absorption spectra acquired for three higher loadings of $VO_2$@$SiO_2$—F nanocrystals in accordance with an embodiment of the disclosure. The plots correspond to 10 mg (dashed lines), 12 mg (solid lines), and 16 mg (dotted lines) dispersed in 10 mL of an aqueous dispersion of 1 wt % (relative to 10 mL water mass) methacrylic acid/ethyl acrylate copolymer cast onto borosilicate glass. Spectra obtained at 30° C. are displayed in black, whereas spectra obtained at 85° C. after equilibration for 10 min are shown in gray; and FIG. 16B is a 3D representation of $VO_2$ optical data plots showing three nanocrystal loadings of the nanocrystals of FIG. 16A in accordance with an embodiment of the disclosure: 10 mg (squares), 12 mg (circles), and 16 mg (diamonds).

DETAILED DESCRIPTION

Buildings consume an inordinate amount of energy accounting for 30-40% of worldwide energy consumption. A major portion of solar radiation is transmitted directly to building interiors through windows, skylights, glazed doors, and the like where this solar heat gain necessitates increased use of air conditioning. Current technologies aimed at addressing this problem suffer from major drawbacks, including but not limited to a reduction in the transmission of visible light, thereby leading to increased use of artificial lighting, and, because these technologies are static across all temperatures, an elimination of the offset in wintertime heating costs that would otherwise be provided due to solar heat gain. There is considerable interest in the development of plastic fenestration elements that can dynamically modulate solar heat gain based on the external climate and are retrofittable onto existing structures.

Thermochromic Compositions

To address these and other needs, the present disclosure provides a composition including a polymeric matrix; and a thermochromic material, such as a crystalline nanomaterial, dispersed in the polymeric matrix. As used herein, "thermochromic" refers to a material or composition that changes its light absorption, light transmittance, or light reflectivity due to a change in temperature. As discussed further herein, such compositions dynamically modulate transmission of light as a function of temperature.

In an embodiment, the thermochromic material is a vanadium oxide thermochromic material. In an embodiment, the theremochromic material comprises $VO_2$. The binary vanadium oxide $VO_2$ is characterized by an abrupt reversible phase transition from an insulator to a metal when heated to ca. 67° C. and this phase transition is accompanied by a dramatic modulation of the electrical conductance and optical transmittance. The low-temperature insulating phase of $VO_2$ has a bandgap of ca. 0.6 eV, which is closed upon metallization, results in a pronounced spectrally selective modulation of the near-infrared (NIR) light transmittance. The pronounced near-room-temperature metal-insulator transition of $VO_2$ provides a means to suppress solar heat gain in a spectrally selective manner.

Several characteristics of $VO_2$ make it particularly intriguing for fenestration applications. The modulation of light transmittance as the material switches from being insulating to metallic is confined primarily to the NIR region of the electromagnetic spectrum and does not involve a substantial modulation of visible light transmittance. In other words, aesthetically unappealing changes in visible light transmittance that can furthermore increase lighting costs are almost entirely mitigated. Additionally, the transition temperature is close to room temperature and can be systematically modulated through scaling to finite size and by the incorporation of dopants, which allows the material to be adjusted for different climate zones. Next, the transition occurs on ultra-fast timescales rendering a homogeneous appearance for optical films and mitigating the patchiness often observed for liquid crystalline or electrochromic devices. Further, optical films incorporating $VO_2$ can be passively switched in response to the external ambient without requiring active electronic control, thereby mitigating the substantial investments oftentimes required by electrochromic units. Also, vanadium is a relatively earth-abundant material that is substantially cheaper than precious metals often used in reflective thin films.

Despite the numerous advantages of $VO_2$ including those enumerated above, there exist several challenges to its utilization in fenestration elements.

An impediment to the application of $VO_2$ in systems that require thermal cycling, such as in a thermochromic fenestration element, is the strain that accompanies the structural phase transition from insulator phase to metal phase. Inhomogeneous lattice strain, which can be as much as 4%, can bring about mechanical degradation or delamination of thin films. Scaling to nanometer-sized dimensions allows for better accommodation of strain, makes these materials resilient to the strain associated with prolonged thermal cycling, and furthermore avoids crack formation and delamination that plague larger crystallites and thin films of $VO_2$.

Additionally, to obtain high-quality optical films that demonstrate a large modulation of NIR transmission with retention of good visible light transmittance, it is important to prevent or reduce Mie scattering. Mie scattering by, for example, particles in thin films gives rise to a mostly temperature-invariant signature and haze, which is undesirable in fenestration elements, such as windows. Mitigating the appearance of a scattering background and thermal-cycling induced strain can include, for example, the use of nanocrystals that have preferred particulate dimensions discussed further herein that are highly crystalline, and retain a large magnitude of the phase transition.

Accordingly, in an embodiment, the thermochromic material is a crystalline vanadium oxide nanomaterial having an average smallest dimension between about 5 nm and about 100 nm. In an embodiment, the crystalline vanadium oxide nanomaterial comprises an average smallest dimension between about 5 nm and about 50 nm. In an embodiment, the crystalline vanadium oxide nanomaterial comprises an average smallest dimension between about 10 nm and about 50 nm. In an embodiment, the crystalline vanadium oxide nanomaterial comprises an average smallest dimension between about 5 nm and about 15 nm. In an embodiment, the crystalline vanadium oxide nanomaterial has a smallest dimension of about 10 nm.

In an embodiment, the crystalline vanadium oxide nanomaterial is a nanomaterial chosen from a nanoparticle, a nanowire, a nanorod, a nanosphere, a nanostar, and combinations thereof.

As described further herein, $VO_2$ has an electronic phase transition that occurs in close proximity to room temperature. Further, as described herein with respect to Example 10, the electronic transition includes a thermally induced transition from an insulator to a metal as temperature increases above an insulator-metal transition temperature. Such an insulator-metal transition is characterized by a sharp increase in carrier density upon metallization resulting in a corresponding increase in reflectance or absorption and a corresponding decrease in NIR light transmittance, as discussed further herein with respect to FIGS. 5A, 5B, 6A. 6B, 7A, 7B, 8A, and 8B.

In an embodiment, the crystalline vanadium oxide nanomaterial has an insulator-metal electronic transition at a temperature between about −20° C. and about 100° C. In an embodiment, the crystalline vanadium oxide nanomaterial has an insulator-metal electronic transition at a temperature between about 40° C. and about 85° C. In an embodiment, the crystalline vanadium oxide nanomaterial has an insulator-metal electronic transition at a temperature between about 25° C. and about 45° C.

As described further herein, the vanadium oxide crystal nanomaterials modulate transmittance of NIR light as part of a temperature-dependent insulator-metal electronic transition. As used herein, modulation of light transmittance refers to a difference between an amount of light transmitted through a composition including crystalline nanomaterials in an insulator state and an amount of light transmitted through the composition including the crystalline nanomaterial in a metallic state. As the vanadium oxide crystal nanomaterials transition from an insulator to a metal, less light, particularly less NIR light, is transmitted through a composition comprising the metallic vanadium oxide crystal nanomaterials. In this regard, compositions of the present disclosure including nanomaterials in a metallic state are configured to reduce solar heat gain compared to the same composition in which the nanomaterial is in an insulator state.

In an embodiment, such modulation of light transmittance can be quantified as the solar ($T_{sol}$: 400-2500 nm), luminous ($T_{lum}$: 400-780 nm) and NIR ($T_{NIR}$: 780-2500 nm) transmittance, which are determined according to the following equations:

$$T_x = \frac{\int \varphi_x(\lambda)T(\lambda)d\lambda}{\int \varphi_x T(\lambda) d\lambda} \text{ where } x = sol/lum/NIR \quad (1)$$

$$\Delta T_x = T_x(\text{low temp}) - T_x(\text{high temp}) \quad (2)$$

where $T(\lambda)$ is the recorded film transmittance, and $\varphi_x(\lambda)$ is the solar irradiance spectrum distribution for air mass 1.5 (corresponding to the sun at 37° above the horizon) over the wavelength range specified. The wavelength ranges for the sol, lum, and NIR ranges of the electromagnetic spectrum denoted as subscripts in Equation 1 are defined as 400-2500 nm, 400-780 nm, and 780-2500 nm respectively.

In an embodiment, such modulation of light transmittance can be expressed as a percentage using the following formula:

$$\left[\frac{T_i - T_m}{T_i}\right] * 100,$$

where $T_i$ is the transmittance of light through a composition in which the vanadium oxide crystal nanomaterials are in an insulating state, and $T_m$ is the transmittance of light through the composition in which the vanadium oxide crystal nanomaterials are in a metallic state.

In an embodiment, modulation of NIR light transmittance is measured at a particular wavelength. In an embodiment, modulation of NIR light transmittance is measured over a wavelength range.

In an embodiment, the modulation of light transmittance between about 680 nm and about 2,500 nm is greater than about 5%. In an embodiment, the integrated modulation of light transmittance between about 680 nm and about 2,500 nm is between 5% and 90%. In an embodiment, integrated modulation of NIR light transmittance is between about 20% and about 50%. In an embodiment, integrated modulation of total solar light transmittance is between about 5% and about 50%. In an embodiment, integrated modulation of visible light transmittance is between about 0% and about 50%.

In an embodiment, onset of NIR light transmittance modulation occurs between about 680 nm and about 1750 nm. In an embodiment, onset of NIR light transmittance modulation occurs between about 700 nm and about 850 nm. In an embodiment, onset of NIR light transmittance modulation occurs between about 740 nm and about 800 nm. As used herein, onset of light transmittance modulation refers to a shortest wavelength at which a composition reduces transmission of light through the composition when a nanomaterial dispersed therein is a metallic state relative to light transmitted through the composition when the nanomaterial is in an insulator state.

As discussed further herein with respect to Example 9, onset of modulation of light transmittance factors into the efficacy of a composition to modulate transmission and solar heat gain. Onset of modulation of NIR light transmittance at relatively shorter wavelengths denotes an ability to dynamically adjust transmittance for a wider portion of the solar spectrum. Accordingly, in an embodiment, compositions described herein have an onset of modulation of NIR light transmittance between about 750 nm and about 1750 nm.

Further, in certain embodiments, NIR light transmittance modulation below 680 nm is not desirable since such modulation leads to a pronounced change of the visible appearance of the film. Accordingly, in an embodiment, compositions described herein have an onset of modulation of NIR light transmittance greater than or equal to 680 nm.

Thermal and chemical stability issues represent a further challenge to inclusion of crystalline thermochromic vanadium oxide into fenestration elements. $VO_2$ is readily oxidized to $V_2O_5$ under ambient conditions, especially upon exposure to moisture. As discussed further herein, the deposition of shells, such as amorphous $SiO_2$ shells, is shown to enhance the thermal and chemical stability of $VO_2$ nanomaterials. Accordingly, in an embodiment the vanadium oxide nanomaterial is a nanomaterial including a crystalline vanadium oxide core; and a passivating layer coating at least a portion of the crystalline vanadium oxide core.

In an embodiment, the passivating layer comprises an amorphous or crystalline matrix chosen from an oxide, sulfide, oxyhydroxide, hydroxide, oxyhalide, carbide, selenide, and combinations thereof. In an embodiment, the amorphous oxide matrix comprises a material chosen from silicon oxide, titanium oxide, vanadium oxide, zinc oxide, hafnium oxide, zirconium oxide, aluminum oxide, cerium oxide, molybdenum oxide, and combinations thereof. Such passivating layers may be coupled to the crystalline vanadium oxide core according to the methods of the present disclosure. In an embodiment, the shell material has a refractive index intermediate between that of vanadium oxide and the host polymeric matrix. In an embodiment, multiple shells are used to provide a gradient of refractive indices (high to low) from the vanadium oxide core to the host polymer matrix.

In an embodiment, the vanadium oxide nanomaterial includes a silane layer grafted to the passivating layer. In an embodiment, the passivating layer itself comprises a silane layer grafted to a surface of the crystalline vanadium oxide core. As described further herein, the silane layer whether grafted to the passivating layer or grafted to the surface of the crystalline vanadium oxide aids in dispersing the crystalline vanadium oxide nanomaterials in the polymer matrix in addition to prevent and/or mitigating oxidation of the crystalline vanadium oxide core. In that regard, crystalline vanadium oxide nanomaterials including a passivating layer are thermally and chemically stable, such as under thermal cycling conditions, and have favorable optical characteristics because the crystalline vanadium oxide nanomaterials are well dispersed within the polymer matrix.

As above, the reduction of scattering can arise from the individual dispersion of the crystalline vanadium oxide nanomaterials within a polymeric matrix, such as a low dielectric constant media. Agglomerated nanomaterials present a scattering background very similar to larger particles and thus obtaining a good dispersion of the nanomaterials is important for providing optically clear thermochromic functional films. Further, the mitigation of scattering allows for a low onset temperature for NIR light transmittance modulation, as discussed further herein.

In an embodiment, the polymeric matrix comprises a polymeric material chosen from a cellulosic polymer, a polycarbonate, a polyimide, a polyurethane, polyvinylidene fluoride, polyethylene terephthalate, and an acrylic acid/acrylate copolymer. In an embodiment, the polymeric matrix comprises a methacrylic acid/ethyl acrylate copolymer In an embodiment, the polymeric matrix has a viscosity of between about 5 mPa*s and about 15 mPa*s.

In an embodiment, the polymeric matrix has an optical transmittance of between about 10% and about 90% in the visible range.

In an embodiment, the polymeric matrix includes a surfactant in addition to the polymer material. As discussed further herein, in certain embodiments, the surfactant aids in dispersing the crystalline vanadium oxide nanomaterial, thus yielding low levels of Mie scattering and low onset wavelengths of light transmittance modulation.

In an embodiment, the surfactant is a perfluorinated surfactant, such as when the crystalline vanadium oxide nanomaterial includes a passivating layer including a perfluorinated silane. In an embodiment, the surfactant is a phosphate ester surfactant.

In an embodiment, a weight:weight ratio of crystalline vanadium oxide nanomaterial to surfactant is between about 10:1 and about 0.1:1. In an embodiment, a weight:weight ratio of crystalline vanadium oxide nanomaterial to surfactant is between about 4:1 and about 1:1. In an embodiment, a weight:weight ratio of crystalline vanadium oxide nanomaterial to surfactant is between about 0.1:1 to about 7:1. In an embodiment, a weight:weight ratio of crystalline vanadium oxide nanomaterial to surfactant is between about 1.5:1 and about 5.5:1.

Representative compositions are described further herein with Examples 1-9.

Thermochromic Substrates

As discussed further herein, the compositions of the present disclosure have advantageous optical clarity and visible light transmission, while also having high levels of NIR light transmittance modulation. Accordingly, in another aspect, the present disclosure provides a substrate having a surface, wherein the surface comprises a film comprising a composition of the present disclosure. In an embodiment, the film comprises a polymeric matrix; and a crystalline vanadium oxide nanomaterial dispersed in the polymeric matrix, wherein the crystalline vanadium oxide nanomaterial comprises a crystalline vanadium oxide core; and a passivating layer coating at least a portion of the crystalline vanadium oxide core.

In an embodiment the substrate is a portion of a fenestration element configured to transmit at least a portion of incident visible light and reflect/absorb at least a portion of NIR and IR light, particularly when over an insulator-metal transition temperature. In an embodiment, the substrate is part of a window unit, an insulating glass unit, a skylight, a glazed door, or the like. In an embodiment, the substrate is chosen from glass, silicon oxide, sapphire, alumina, polymer, plastic, and indium tin oxide-coated glass.

In an embodiment, the substrate is configured to couple an existing fenestration element without replacement of an optically clear portion of the fenestration element.

In an embodiment, the film has a thickness of between about 500 nm and about 500 microns. In an embodiment, the film has a thickness of between about 1 micron and about 350 microns. In an embodiment, the film has a thickness of between about 10 microns and about 200 microns. In an embodiment, the film has a thickness of between about 500 nm and about 3 microns. In an embodiment, the film has a thickness of between about 200 nm and about 1 micron. In an embodiment, the film has a thickness of between about 100 nm and about 5 microns. In an embodiment, the film has a thickness of between about 10 nm and about 50 microns.

In an embodiment, the integrated visible light transmittance of the film is between about 15% and about 90%. In an embodiment, the integrated visible light transmittance of the film is between about 15% and about 70%. In an embodiment, the integrated visible light transmittance of the film is between about 15% and about 50%. In an embodiment, the integrated visible light transmittance of the film is between about 20% and about 50%. In an embodiment, the integrated visible light transmittance of the film is between about 25% and about 55%. In an embodiment, the integrated visible light transmittance of the film is between about 25% and about 70%.

In an embodiment, the films described herein have a maximum transmittance in the visible range between about 15% and about 90%. In an embodiment, the films described herein have a maximum transmittance in the visible range between about 25% and about 70%.

As discussed further herein with respect to TABLES 1-5, transmittance in the visible spectrum is dependent upon, inter alia, particle size, passivating layer, composition of polymeric matrix, and surfactant and particle loading in the polymeric matrix.

Representative substrates are described further herein with respect to Examples 7-9.

Methods of Making a Crystalline Vanadium Oxide Nanomaterial Dispersed in a Polymeric Matrix A challenge with the preparation of hybrid nanocomposites is to ensure adequate dispersion of the inorganic filler within the polymeric host matrix in order to realize properties such as mechanical reinforcement, electrical percolation, or matching of dielectric constants for specific optical applications. For applications of $VO_2$ nanocomposite thin films as thermochromic elements, particle sizes <100 nm are shown to prevent or significantly reduce a large Mie scattering background. This is particularly so where the high-dielectric-constant particles (n=2.7, k=0.65), such as crystalline vanadium oxide nanomaterials, are embedded within a low-dielectric-constant medium without agglomeration.

For many semiconductor and oxide materials, solution-phase synthetic methods yield nanocrystals capped with surface passivating ligands that can be readily dispersed within polymeric host matrices. However, the metal-insulator transition as well as the preferred phase of $VO_2$ are both extremely sensitive to the oxygen stoichiometry and crystallinity; consequently, high-quality $VO_2$ nanomaterials exhibiting pronounced electronic phase transitions have not been accessible from such hot colloidal decomposition routes prior to the present invention.

Accordingly, in another aspect, the present disclosure provides a method of making a crystalline vanadium oxide nanomaterial dispersed in a polymeric matrix, wherein the crystalline vanadium oxide nanomaterials are well dispersed within the polymeric matrix and are chemically, mechanically, and thermally stable.

In an embodiment, the method includes hydrothermally annealing amorphous vanadium oxide to provide a crystalline vanadium oxide nanomaterial; coating the crystalline vanadium oxide nanomaterial with a passivating layer; and dispersing the coated crystalline vanadium oxide nanomaterial in a polymeric matrix.

As discussed further herein with respect to FIGS. 1A and 1B, in an embodiment, the method includes a reaction providing amorphous $VO_2$ and crystallization of the amorphous precursor. In an embodiment, the method includes precipitation of $VO(OH)_2$ from a reaction between ammonium metavanadate ($NH_4VO_3$) and hydrazine ($H_2NNH_2$) and hydrothermal annealing of the $VO(OH)_2$ precipitate in a hydrothermal vessel at about 200° C. for 24-72 hours.

In an embodiment, hydrothermally annealing amorphous vanadium oxide includes heating a vanadium oxide compound, such as $VO(OH)_2$ at a temperature of between about 100° C. and 500° C. In an embodiment, hydrothermally annealing amorphous vanadium oxide includes heating a vanadium oxide compound, such as $VO(OH)_2$ at a temperature of between about 100° C. to about 250° C. In an embodiment, hydrothermally annealing amorphous vanadium oxide includes heating a vanadium oxide compound, such as $VO(OH)_2$ at a temperature of between about 150° C. to about 250° C. In an embodiment, hydrothermally annealing amorphous vanadium oxide includes heating a vanadium oxide compound, such as $VO(OH)_2$ at a temperature of between about 200° C. to about 250° C. In an embodiment, hydrothermally annealing amorphous vanadium oxide includes heating a vanadium oxide compound, such as $VO(OH)_2$ at a temperature of between about 150° C. to about 450° C. In an embodiment, hydrothermally annealing amorphous vanadium oxide includes heating a vanadium oxide compound, such as $VO(OH)_2$ at a temperature of between about 200° C. to about 450° C. In an embodiment, hydrothermal annealing is performed in an autoclave.

In an embodiment, hydrothermally annealing amorphous vanadium oxide is performed at a pressure of between about 70 pounds per square inch (p.s.i.) and about 5,000 p.s.i. In an embodiment, hydrothermally annealing amorphous vanadium oxide is performed at a pressure of between about 3,000 p.s.i. and about 5,000 p.s.i. In an embodiment, hydrothermally annealing amorphous vanadium oxide is performed at a pressure of between about 200 p.s.i. and about 4,000 p.s.i. In an embodiment, hydrothermally annealing amorphous vanadium oxide is performed at a pressure of between about 500 p.s.i. and about 5,000 p.s.i. In an embodiment, hydrothermally annealing amorphous vanadium oxide is performed at a pressure of between about 100 p.s.i. and about 500 p.s.i.

The methods described herein provide highly crystalline vanadium oxide nanomaterials. In certain embodiments, the methods of the present disclosure yield crystalline $VO_2$ nanocrystals exhibiting an abrupt (<1° C. sharpness) almost five orders of magnitude electronic phase transition and an electrical bandgap of 0.6 eV, consistent with the optical bandgap.

Figure 2A:
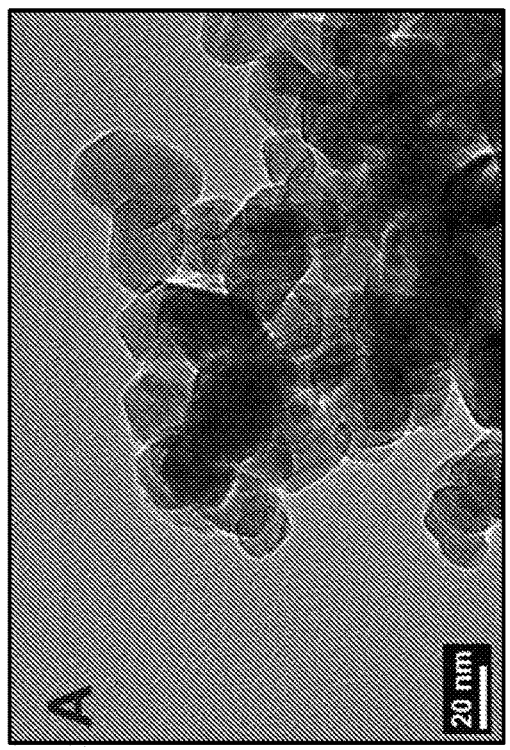
FIG. 2A is a transmission electron microscopy (TEM) image of as-prepared $VO_2$ nanocrystals.

While hydrothermal methods yield high-crystalline-quality faceted nanocrystals, the absence of surface passivating ligands tends to result in considerable agglomeration of the obtained materials and renders them difficult to disperse in solvents or polymeric matrices, as discussed further herein with respect to FIG. 2A. Accordingly, in an embodiment, the methods of the present disclosure include coating the crystalline vanadium oxide nanomaterial with a passivating layer.

In an embodiment, coating the crystalline vanadium oxide nanomaterial with a passivating layer includes encapsulating the crystalline vanadium oxide nanomaterial in an amorphous or crystalline matrix. In an embodiment, the amorphous or crystalline matrix is chosen from an oxide, sulfide, oxyhydroxide, hydroxide, oxyhalide, carbide, selenide, and combinations thereof. In an embodiment, coating the crystalline vanadium oxide nanomaterial with a passivating layer includes depositing an $SiO_2$ shell onto the crystalline vanadium oxide nanomaterial. In an embodiment, depositing an $SiO_2$ shell onto the crystalline vanadium oxide nanomaterial includes reacting tetraorthosilicate with $VO_2$ oxide nanocrystals to provide crystalline vanadium oxide nanocrystals including a $SiO_2$ shell, as schematically illustrated in FIG. 1D.

In an embodiment, coating the crystalline vanadium oxide nanomaterial with a passivating layer includes functionalizing a surface of the crystalline vanadium oxide nanomaterial with a silane. In an embodiment, functionalizing the surface of the crystalline vanadium oxide nanomaterial with a silane includes grafting a silane to surface hydroxyl groups on a crystalline vanadium oxide nanocrystals, such as with perfluorinated silane, as schematically illustrated in FIG. 1F. In an embodiment, the perfluorinated silane is (heptadecafluoro-1,1,2,2-tetrahydrodecyl)trimethoxysilane.

In an embodiment, coating the crystalline vanadium oxide nanomaterial with a passivating layer includes grafting a silane, such as a perfluorinated silane onto another portion of the passivating layer, such as an $SiO_2$ shell encapsulating the crystalline vanadium oxide nanomaterial, as schematically illustrated in FIG. 1E.

As discussed further herein, such passivating layers aid in dispersing the crystalline vanadium oxide nanomaterials in polymeric matrices. Further, the passivating layers substantially mitigate light scattering, which is further correlated to the advantageous thermochromic properties of the compositions of the present disclosure, including a high degree of NIR light transmittance modulation and visible light transmittance, as discussed with respect to FIGS. 5A, 5B, 6A, 6B, 7A, 7B, 8A, and 8B.

The methods described herein include dispersing the coated crystalline vanadium oxide nanomaterial in a polymeric matrix. As discussed further herein, such dispersing reduces or prevents agglomeration of crystalline vanadium oxide nanomaterials, thereby reducing or preventing Mie scattering. In an embodiment, dispersing the coated crystalline vanadium oxide nanomaterial in a polymeric matrix includes dispersing the coated crystalline vanadium oxide nanomaterial in an aqueous polymeric dispersion; and curing the aqueous polymeric dispersion to provide a polymeric matrix.

For viable hydrothermal annealing of nanomaterials and casting of large-area films, the use of aqueous processes is desirable given increasing concerns regarding the toxicity of organic solvents and curing agents. However, this in itself brings a fresh set of challenges since the low viscosity of water makes it difficult to cast films using standard liquid coating processes. In an embodiment, the present disclosure provides an entirely aqueous processing approach for obtaining $VO_2$ nanocomposite thin films showing a high degree of NIR light transmittance modulation and visible light transmittance. In this regard, in an embodiment, hydrothermally annealing the amorphous vanadium oxide is free of or is substantially free of organic solvents. In this instance, "free of or substantially free of organic solvents" refers to a solution or a dispersion having between 1% and 0% organic solvents as limited by detection methods known in the art.

While dispersing methods including ultrasonication and stirring are discussed herein, it will be understood that other methods of dispersing, such as sonication, vortexing, and the like, can be used to disperse the crystalline vanadium oxide nanomaterials, polymeric matrices, and other dispersion components.

As discussed further herein, in an embodiment, the methods of the present disclosure include curing the aqueous polymeric dispersion to provide the polymeric matrix. In an embodiment, curing includes curing the aqueous polymeric dispersion in air at room temperature. In an embodiment, curing includes curing the aqueous polymeric dispersion with ultraviolet light, moisture, and the like.

In an embodiment, the methods described herein include forming the crystalline vanadium oxide nanomaterial dispersed in a polymeric matrix into a film disposed on a surface. In an embodiment, forming the film includes depositing the crystalline vanadium oxide nanomaterial dispersed in a polymeric matrix onto the substrate and casting the film on the substrate with a casting knife.

In an embodiment the substrate is a portion of a fenestration element. In an embodiment, the substrate is part of a window unit, an insulating glass unit, a skylight, a glazed door, or the like. In an embodiment, the substrate is chosen from glass, silicon oxide, sapphire, alumina, polymer, plastic, and indium tin oxide-coated glass.

In an embodiment, the substrate is configured to couple to an existing fenestration element without replacement of an optically clear portion of the fenestration element.

Representative methods are described further herein with respect to Examples 1-5.

EXAMPLES

Figure 1:
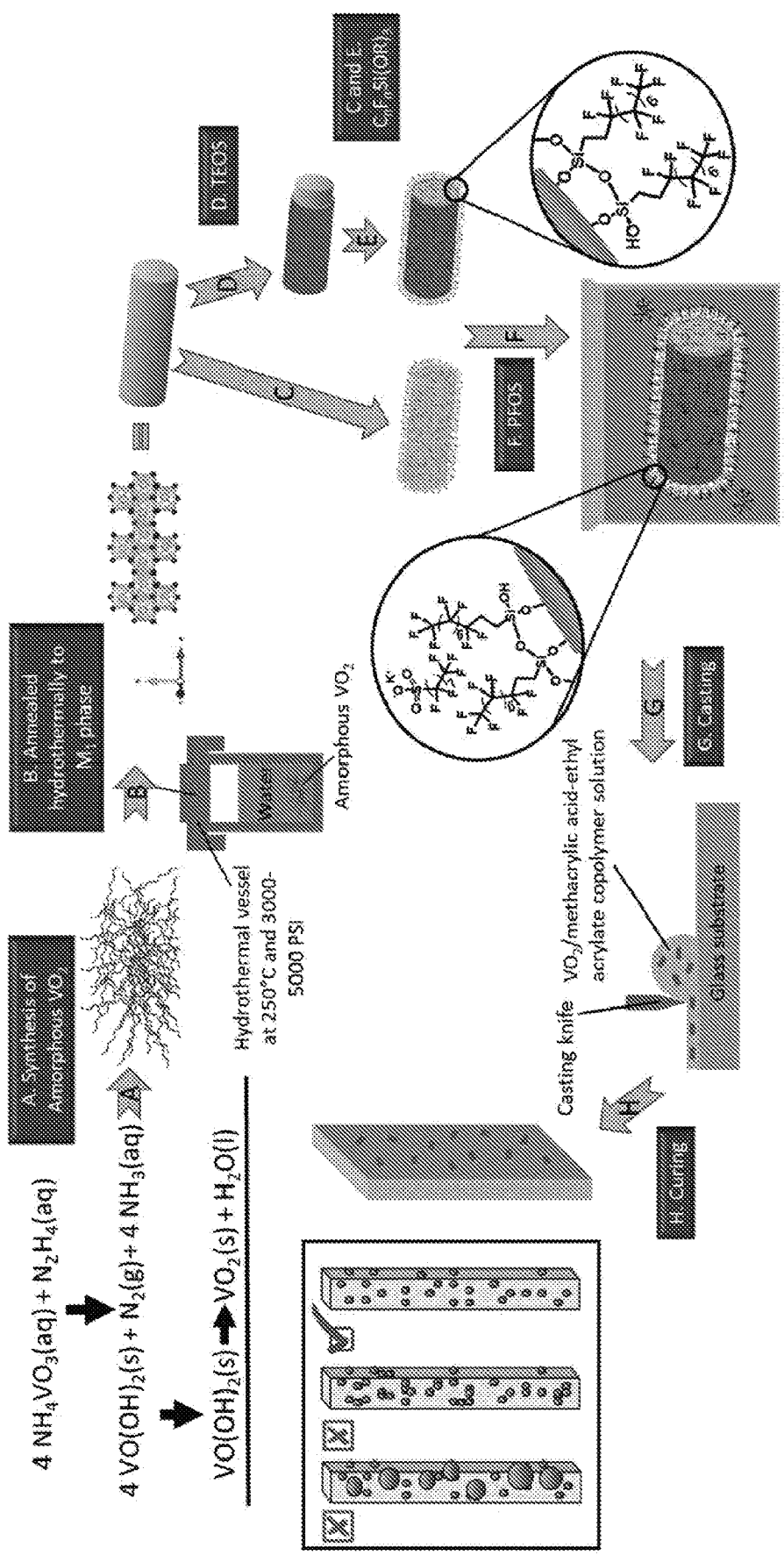
FIGS. 1A-H schematically illustrate an overall process for preparation of thermochromic fenestration elements. A. Reaction leading to the synthesis of amorphous $VO_2$. B. Crystallization of amorphous precursors to obtain $VO_2$ nanocrystals stabilized in the M1 phase. C. Grafting of trimethoxy(1H,1H,2H,2H-perfluorooctyl)silane to the surface of bare $VO_2$ nanowires, or D, application of an amorphous $SiO_2$ shell by reaction with TEOS as per the modified Stöber method. E. Grafting of trimethoxy(1H,1H,2H,2H-perfluorooctyl)silane to the silica-coated surface. F. Dispersion of $VO_2$ and $VO_2@SiO_2$ nanocrystals bearing pendant fluorinated moieties in water using perfluorooctanesulfonate (PFOS) followed by addition of the methacrylic acid/ethyl acrylate polymeric matrix. G. Application of dispersion to cleaned borosilicate glass and the preparation of uniform thin films using a casting knife. H. Curing for 12 h in order to obtain the final thermochromic films. The inset on the left schematically illustrates the desired ideal of small particles homogeneously dispersed within a polymeric matrix and depicts from left to right the following scenarios: large particles that scatter light, agglomerations of small particles that have a similar effect, and, the ideal case, small, individually dispersed particles.

Example 1: An Aqueous-Phase Synthetic Route to Ultra-Small $VO_2$ Nanocrystals A two-step procedure was developed to prepare phase-pure $VO_2$ nanocrystals. The first step involves the precipitation of $VO(OH)_2$ from a reaction between ammonium metavanadate ($NH_4VO_3$) and hydrazine ($H_2NNH_2$) in deionized water (p=18.2MΩ/cm, Barnstead Water Purification System) at 80° C. (FIG. 1). The second step was the hydrothermal annealing of the $VO(OH)_2$ precipitate in a hydrothermal vessel at 210° C. for 24-72 hours. The product was recovered by centrifugation at 8500 rpm and the aqueous supernatant was decanted. The solid was then dispersed in acetone via ultrasonication, centrifuged at 8500 rpm, followed by the decanting of the acetone supernatant. This acetone washing process was carried out a total of three times.

FIGS. 1A and 1B depict a reaction yielding $VO_2$ nanocrystals. FIG. 2A depicts transmission electron microscopy images of the as-prepared $VO_2$ nanocrystals. Based on statistical analysis of 350 particles, an average crystallite size of 44±30 nm has been deduced. The crystallites are clearly clustered within larger agglomerates. FIG. 2B shows a powder XRD pattern acquired for the as-prepared $VO_2$ nanocrystals, which can be indexed to the monoclinic M1 phase of $VO_2$ (Joint Committee on Powder Diffraction Standards (JCPDS) 43-1051). Powder X-ray diffraction (XRD) data was obtained using a Bruker D8-Focus Bragg-Brentano diffractometer equipped with a Lynxeye detector. The Scherrer broadening of the reflections further corroborates their nanometer-sized dimensions.

Example 2: Deposition of a $SiO_2$ Shell onto $VO_2$ Nanocrystals

FIGS. 1A and 1B schematically illustrate surface functionalization and dispersion strategy used to obtain homogeneous thermochromic films. As, shown, amorphous silica shells were constituted using a modified Stöber method, as reported in previous work. Briefly, 24-48 mg of VO$_2$ nanocrysals were ultrasonicated in an 4:1 (v/v) 200 proof ethanol: water solution to obtain a homogeneous dispersion. 400 µL of ammonium hydroxide (NH$_4$OH) (0.25 M final solution) was used as the catalyst with 24 mg of VO$_2$ nanocrystals. The catalyst was added to the VO$_2$ dispersion in 8 mL nanopure water and 32 mL ethanol under vigorous ultrasonication over a period of 10 min. Subsequently, 200 µL tetraethylorthosilicate (TEOS) was added to this dispersion (yielding a 0.02 M concentration of TEOS), as schematically illustrated in FIG. 1D. After reaction for 25 minutes at room temperature, the VO$_2$@SiO$_2$ core-shell nanocrystals were collected by centrifugation. The solid was purified by redispersing in ethanol and collection via centrifugation over three cycles.

Example 3: Surface Functionalization with Fluorinated Silanes

Figure 10A:
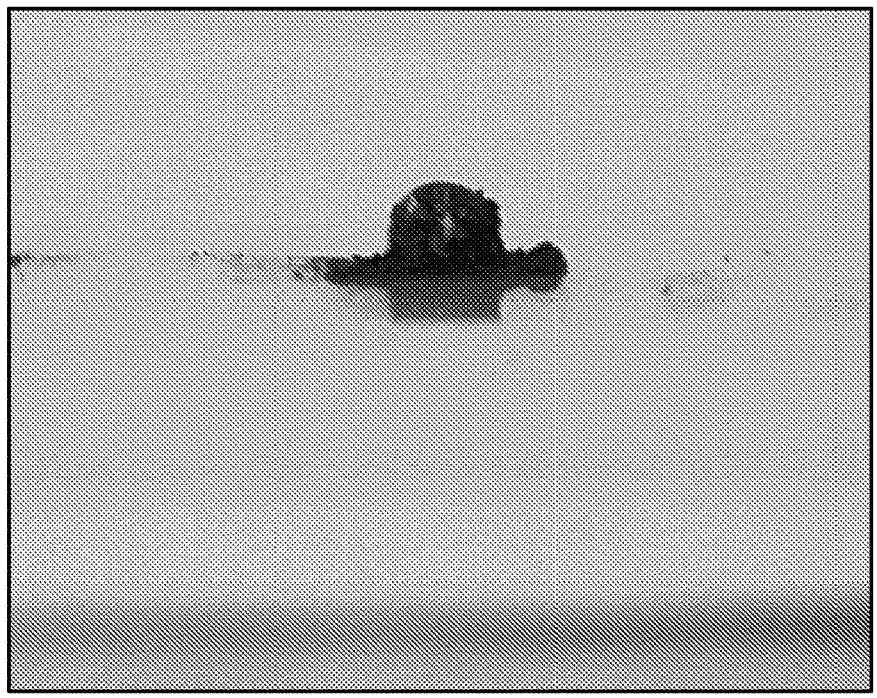
FIG. 10A is an image showing the interaction of a water droplet with $VO_2@$-F nanocrystals in accordance with an embodiment of the disclosure; functionalization with a perfluorinated silane renders the surface hydrophobic, although not to the same extent as fluorinated $VO_2@SiO_2$—F core-shell nanocrystals.
Figure 10B:
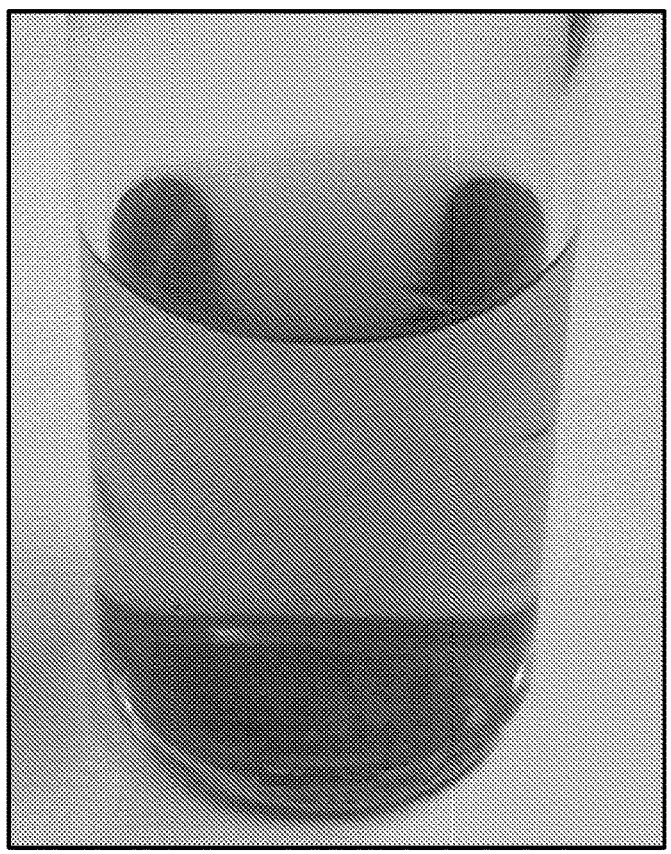
FIG. 10B is an image of $VO_2@$-F nanocrystals dispersed in a perfluorinated solvent in accordance with an embodiment of the disclosure.

Hydrothermally grown VO$_2$ nanocrystals have a high density of surface hydroxyl groups, which can be reacted with silanols to create V—O—Si linkages. Such condensation reactions allow for installation of molecular monolayers on VO$_2$ surfaces when appropriately functionalized silanes are used. A perfluorinated silane has been grafted directly onto the VO$_2$ surfaces or onto the surfaces of VO$_2$@SiO$_2$ core-shell nanocrystals, as schematically illustrated in FIGS. 1C, 1E, and 1F. In both cases, a 0.02M solution of (heptadecafluoro-1,1,2,2-tetrahydrodecyl)trimethoxysilane in tetradecafluorohexane (>96% purity) was prepared and stored within polypropylene receptacles. In a typical reaction, 24 mg of VO$_2$ (or VO$_2$@SiO$_2$) nanocrystals was added to the 0.02 M perfluorinated silane solution in tetradecafluorohexane, ultrasonicated for roughly 5 min, and allowed to stir overnight to graft the fluorinated siloxane layer onto the nanocrystal surfaces. No water was added during the reaction but the hydrothermally prepared VO$_2$ nanocrystals contain surface adsorbed water that facilitates hydrolysis of the silane. After reaction, the solid was purified by redispersing in tetradecafluorohexane and collection via centrifugation for a total of three cycles to remove adsorbed (but not covalently grafted) silanes. After surface functionalization, the nanocrystals can no longer be dispersed in water but are readily dispersible in tetradecafluorohexane, which provides a rapid means of evaluating the success of the grafting step. See FIGS. 4B and 10B. As-prepared VO$_2$ nanocrystals functionalized with the perfluorinated silane are denoted as VO$_2$@-F. Core-shell VO$_2$@SiO$_2$ nanocrystals were also functionalized with the perfluorinated silane and are designated as VO$_2$@SiO$_2$—F.

The silane functionalization is important from a practical materials degradation perspective. As-prepared VO$_2$ is partially oxidized to V$_6$O$_{13}$ within fewer than 7 days upon dispersion in water (at neutral pH) with characteristic green coloration of the latter phase visible to the naked eye. In contrast, VO$_2$@SiO$_2$ dispersions show no degradation even after 6 weeks. The VO$_2$@-F and VO$_2$@SiO$_2$—F nanocrystals are completely hydrophobic (FIG. 4A and FIG. 10A, respectively) and maintain their integrity for >12 weeks upon exposure to aqueous media, which further is attributed to the precise ordering of the pendant perfluorinated monolayers that form a close-packed array on the nanocrystal surfaces. The ability to prevent degradation of VO$_2$ is important to the preparation and storage of formulations for casting thermochromic thin films but perhaps more importantly suggests that the thermochromic elements will be far more resilient upon exposure to high humidity conditions as a result of silane functionalization.

Example 4: Insulator-to-Metal Transitions

Figure 2C:
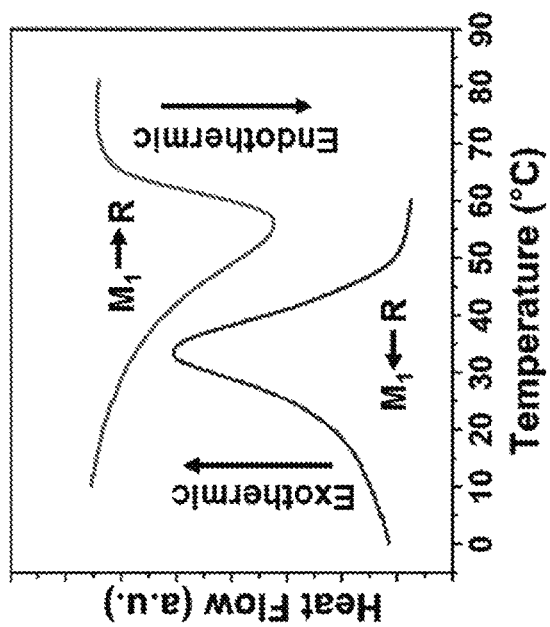
FIG. 2C is a differential scanning calorimetry (DSC) plot acquired for as-prepared $VO_2$ nanocrystals indicating an endothermic transition upon heating in gray and an exothermic transition upon cooling in black.
Figure 2B:
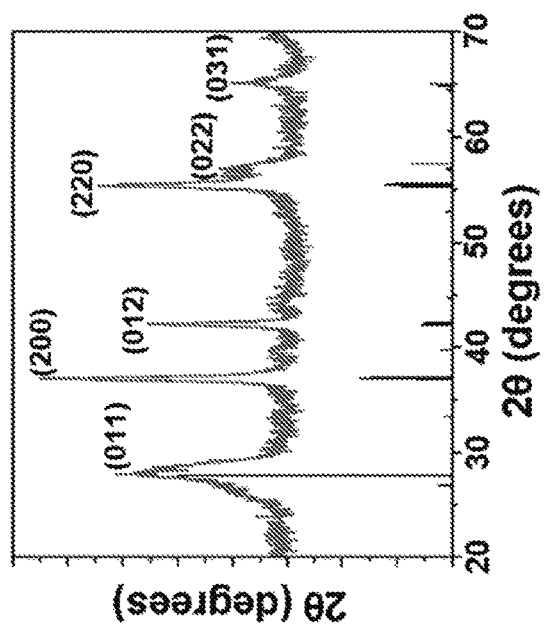
FIG. 2B is a powder x-ray diffraction (XRD) pattern acquired for $VO_2$ nanocrystals (The Scherrer broadening of the reflections attests to the small crystallite dimensions of the obtained materials)

FIG. 2C plots differential scanning calorimetry traces acquired for these samples, which exhibit pronounced features corresponding to the endothermic transition of M1 to rutile VO$_2$ (insulator to metal) and the exothermic transition of rutile to M1 phase VO$_2$ (metal to insulator). Differential scanning calorimetry (DSC) traces were recorded on a Q2000 T A Instrument calorimeter using aluminum pans and lids. A scanning rate of 15° C. per minute under argon was used for the DSC measurements.

The measured heat flow corresponds to a discontinuous change of lattice enthalpy originating from the structural phase transition as well as pronounced step-change of the conduction entropy of electrons upon metallization. The observed hysteresis between heating and cooling cycles is characteristic of first-order transitions.

Figure 3A:
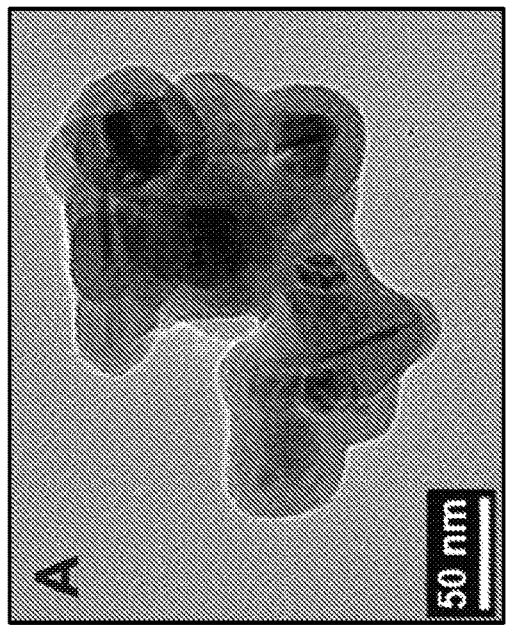
FIG. 3A is a TEM image of core-shell $VO_2@SiO_2$ nanocrystals in accordance with an embodiment of the disclosure.
Figure 3C:
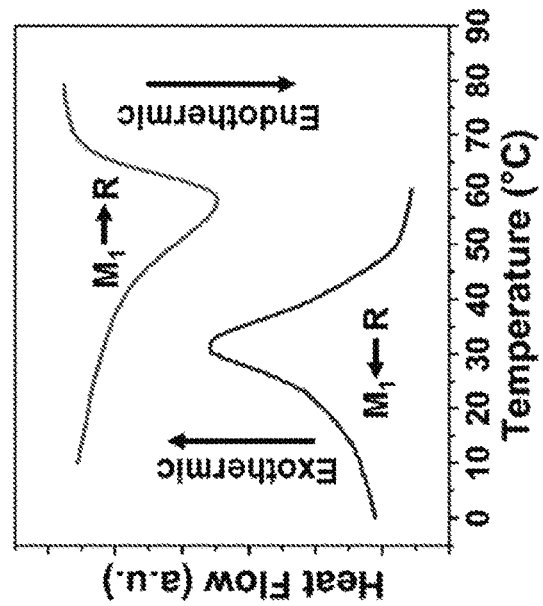
FIG. 3C is a DSC trace of ultra-small $VO_2@SiO_2$ nanocrystals in accordance with an embodiment of the disclosure showing an endothermic transition at 58° C. upon heating and an exothermic transition at 31° C. upon cooling.

Example 5: Aqueous Dispersions of Functionalized VO$_2$ Nanocrystals Using a Perfluorinated Surfactant In order to disperse the nanocrystals, protect them from oxidation, and to facilitate further processing, two approaches have been developed based on grafting of silanes to the surface hydroxyl groups of the hydrothermally prepared VO$_2$ nanocrystals (FIG. 1). Reaction with TEOS as per the modified Stöber method yields core—shell VO$_2$@SiO$_2$ nanocrystals as depicted in FIG. 3. In the TEM image shown in FIG. 3A, the high-electron density crystalline VO$_2$ cores can be readily resolved from the amorphous SiO$_2$ shells. Transmission electron microscopy (TEM) images were recorded on a JEOL JEM-2010 instrument operated at an acceleration voltage of 200 kV.

Figure 3B:
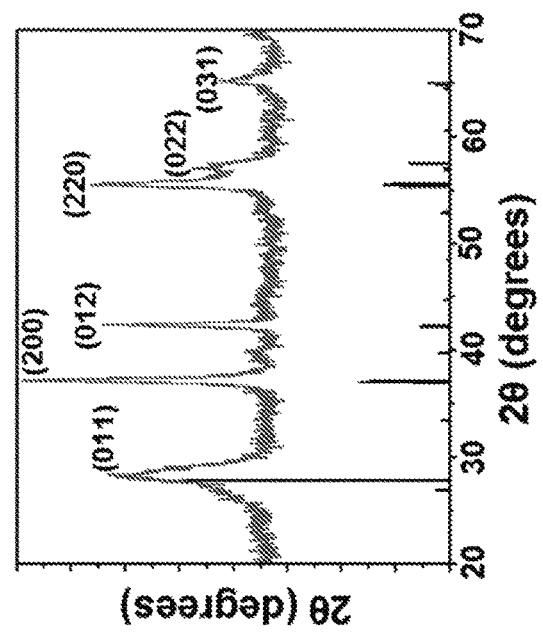
FIG. 3B is a powder XRD pattern acquired for core-shell nanocrystals indexed to the M1 phase of $VO_2$ in accordance with an embodiment of the disclosure (No pronounced changes in XRD pattern are discernible upon deposition of $SiO_2$)

The SiO$_2$ shells engender a reduced degree of agglomeration and form a matrix encapsulating the VO$_2$ nanocrystals. The hydrophilic SiO$_2$ shells facilitate facile dispersion of the particles in water as schematically depicted in FIG. 1 and discussed below. FIG. 3B illustrates that no new reflections are observed in the XRD pattern upon deposition of SiO$_2$ attesting to the amorphous nature of the shell. The DSC data in FIG. 3C further indicates that SiO$_2$ deposition does not alter the temperature or magnitude of the phase transition.

Figure 11A:
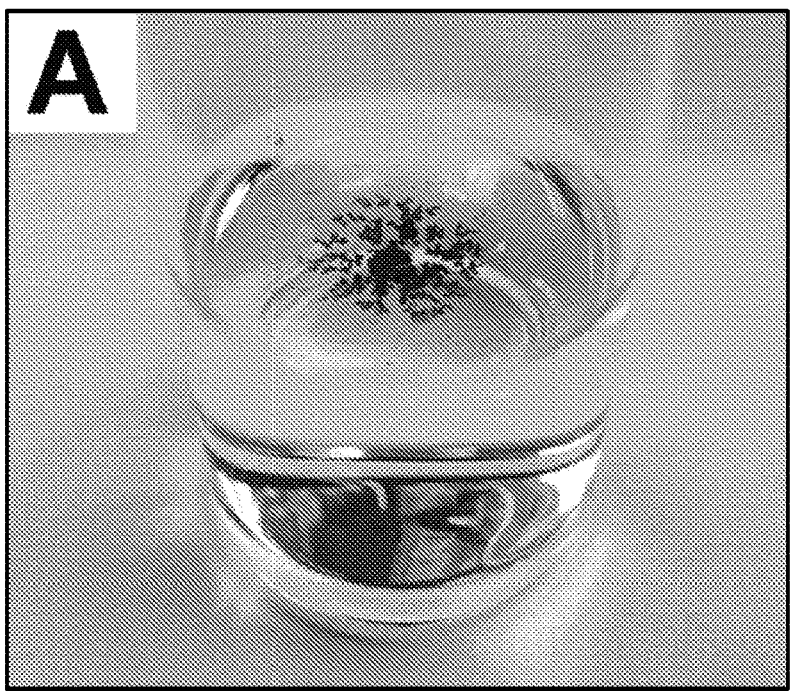
FIG. 11A is an image of $VO_2@$-F nanocrystals in accordance with an embodiment of the disclosure in water indicating their water repellency as a result of the pendant perfluorinated chains.
Figure 11B:
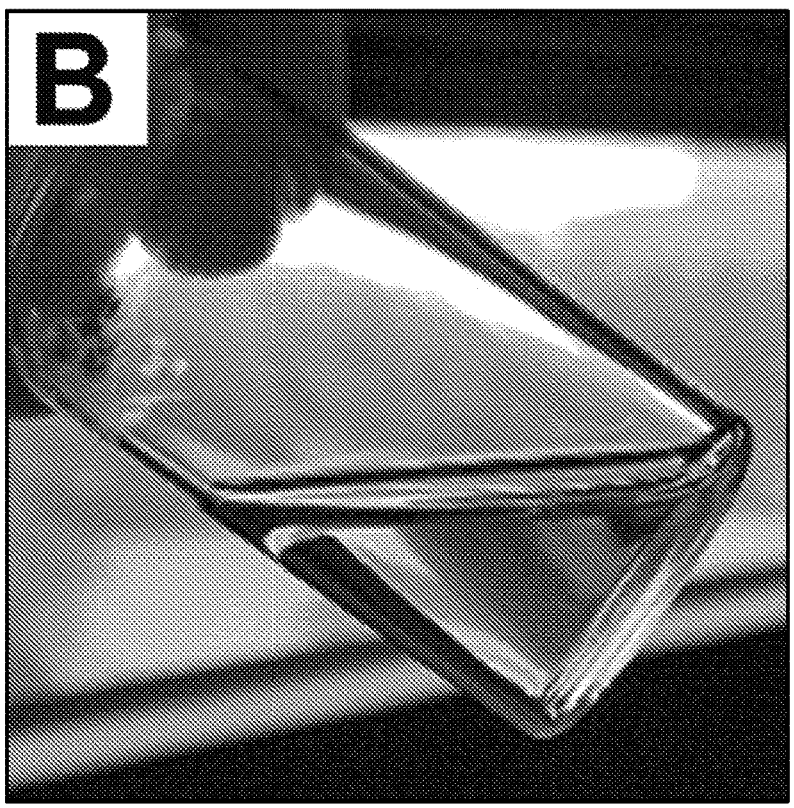
FIG. 11B is an image of an aqueous dispersion of 0.04 mg/mL $VO_2@$-F with $1.5 \times 10^{-3}$ M PFOS in accordance with an embodiment of the disclosure showing stabilization of a homogenous and stable colloidal dispersion.

Potassium perfluorooctanesulfonate (PFOS) was used to disperse the functionalized VO$_2$@-F and VO$_2$@SiO$_2$—F in water. See FIG. 11B. In order to facilitate dispersion of the fluorinated nanocrystals in aqueous media, a fluorosurfactant PFOS has been titrated. The perfluorinated pendant chain of PFOS is able to interact with the perfluorinated pendant chains of the functionalized VO$_2$@-F (and VO$_2$@SiO$_2$—F) nanocrystals, whereas its sulfonate terminal group imparts aqueous solubility. FIGS. 11A and 11B are images of VO$_2$@-F in water before and after the addition of PFOS, respectively. The addition of PFOS clearly results in stabilization of a homogeneous colloidal dispersion.

Briefly, a given amount of the VO$_2$@-F and VO$_2$@SiO$_2$—F solid was dispersed in 10 mL of water at a pH of ca. 11.5 along with 1 mg of PFOS and the mixture was ultrasonicated for ca. 20 min. Adjustments to solution pH were monitored with a HACH HQ411d benchtop pH/mV meter utilizing an IntelliCal™ PHC201 standard gel-filled pH electrode.

Subsequently, additional amounts of solid PFOS were added in increments of 1-2 mg until the solids were homogeneously dispersed in the alkaline deionized water solution. Care must be taken to ensure that a minimal amount of surfactant is utilized in order to avoid surfactant agglomeration and micelle formation that can degrade the optical quality of thin films. The proportions of PFOS to the functionalized $VO_2$@-F and $VO_2$@$SiO_2$—F solids used to obtain homogeneous 10 mL dispersions were as follows: 2 mg fluorinated solid to ca. 1.1 mg PFOS, 4 mg fluorinated solid to ca. 1.5 mg PFOS, 6 mg fluorinated solid to ca. 1.7 mg PFOS, 8 mg fluorinated solid to ca. 1.6 mg PFOS, 10 mg fluorinated solid to ca. 3.0 mg PFOS, 12 mg fluorinated solid to ca. 3.2 mg PFOS, and 16 mg fluorinated solid to ca. 3.0 mg PFOS.

Figure 4A:
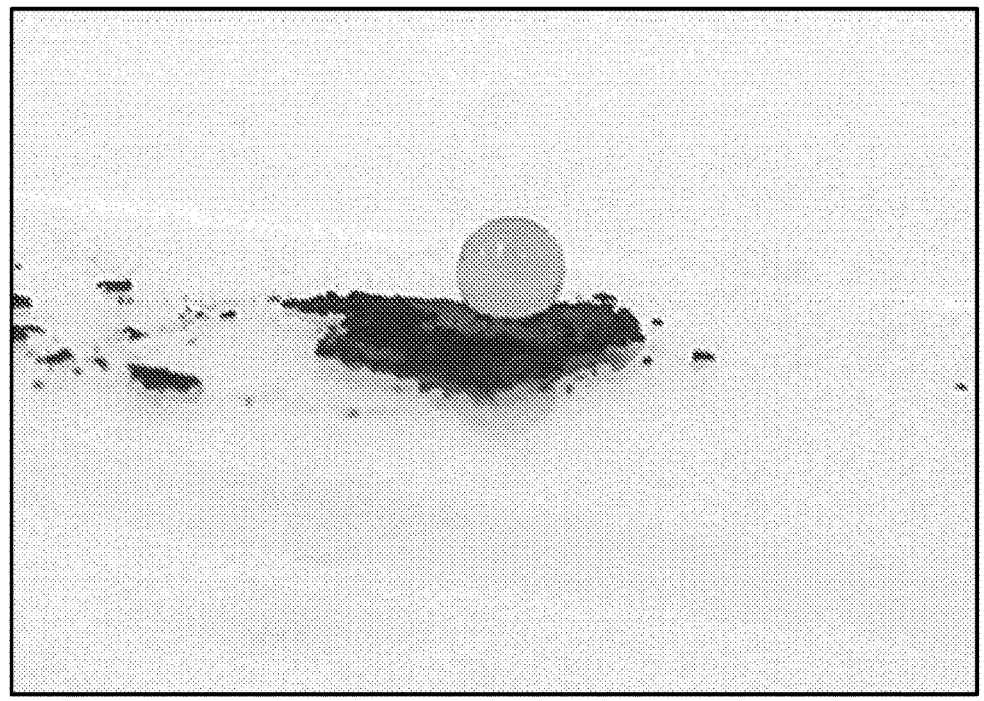
FIG. 4A is a digital photograph showing the interaction of a water droplet with $VO_2@SiO_2$—F nanocrystals in accordance with an embodiment of the disclosure (functionalization with a perfluorinated silane renders the surface superhydrophobic)
Figure 4B:
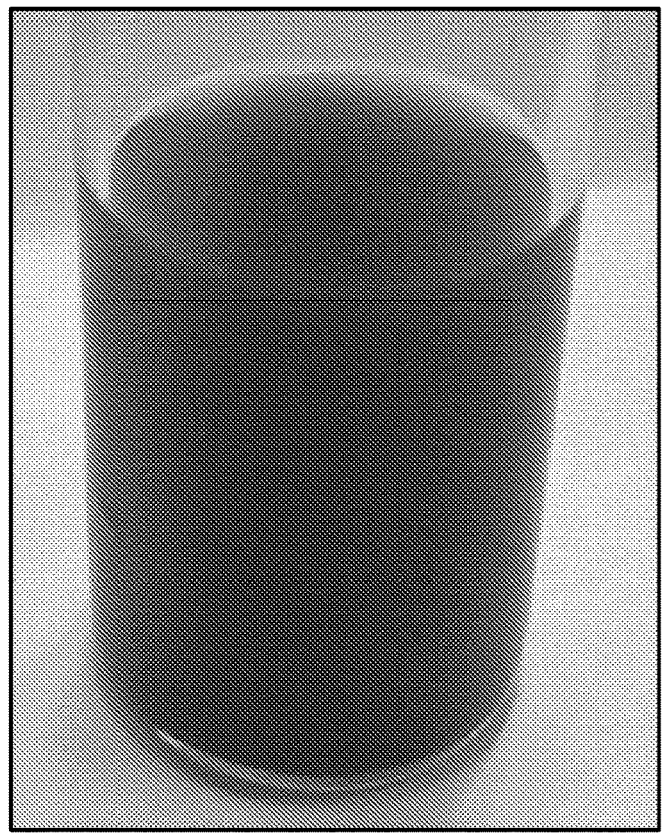
FIG. 4B is an image of $VO_2@SiO_2$—F nanocrystals dispersed in a perfluorinated solvent in accordance with an embodiment of the disclosure.

In an alternative approach, as also schematically illustrated in FIG. 1, the as-prepared core-shell $VO_2$@$SiO_2$ nanowires are reacted with (heptadecafluoro-1,1,2,2-tetrahydrodecyl)trimethoxysilane in tetradecafluorohexane solution. Reaction with the perfluorinated silane installs perfluorinated groups on the nanocrystal surface. The $VO_2$@$SiO_2$@-F nanocrystals are rendered completely hydrophobic as indicated by FIG. 4A but can be readily dispersed in tetradecafluorohexane (FIG. 4B). In contrast, as-prepared $VO_2$ nanocrystals can be somewhat dispersed in water and are not wetted at all by tetradecafluorohexane.

Figure 4C:
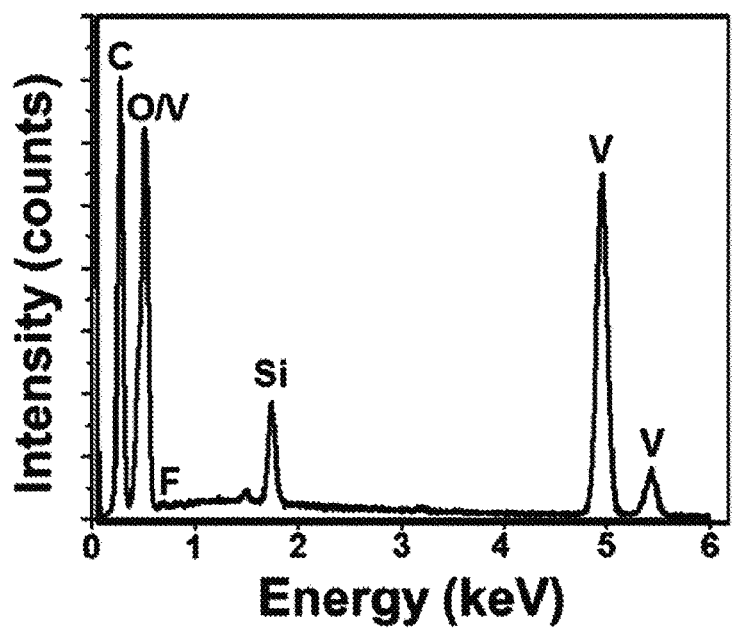
FIG. 4C is an Energy-dispersive X-ray spectroscopy (EDX) spectrum of $VO_2@SiO_2$—F nanocrystals in accordance with an embodiment of the disclosure.
Figure 4D:
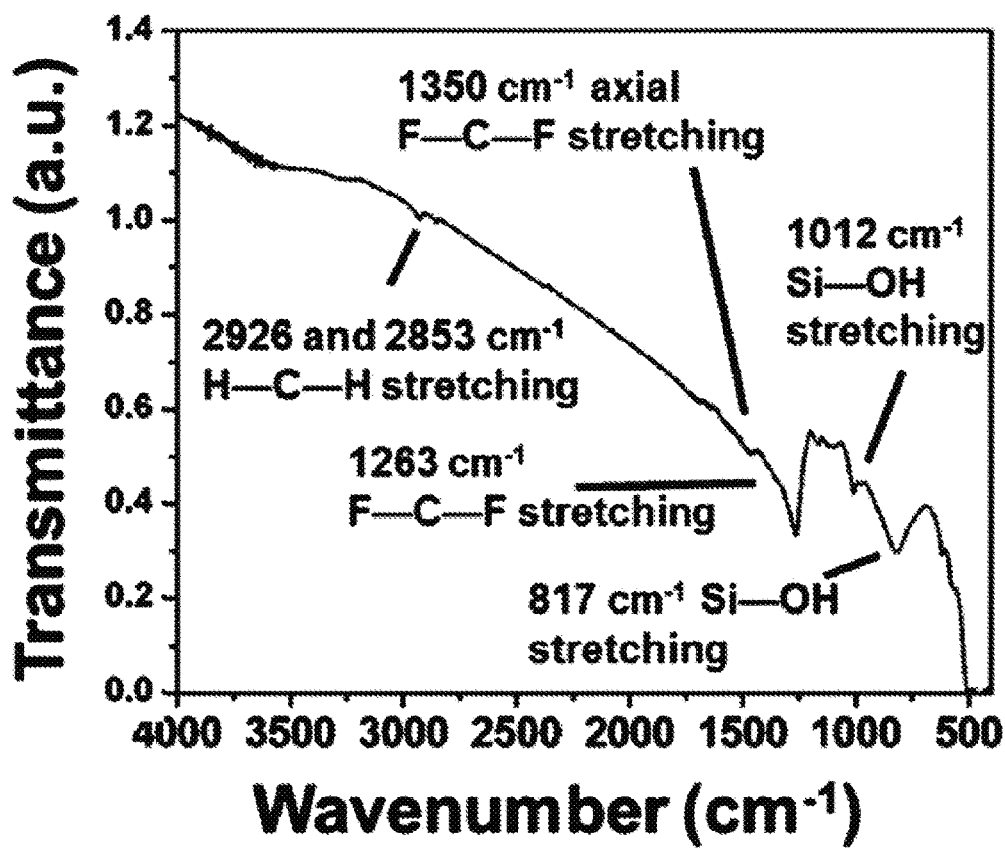
FIG. 4D is a Fourier Transform infrared (FTIR) attenuated total reflectance (ATR) spectrum of $VO_2$ nanowires functionalized with trimethoxy(1H,1H,2H,2H-perfluorooctyl)silane in accordance with an embodiment of the disclosure showing characteristic modes of the perfluorinated moieties.
Figure 10C:
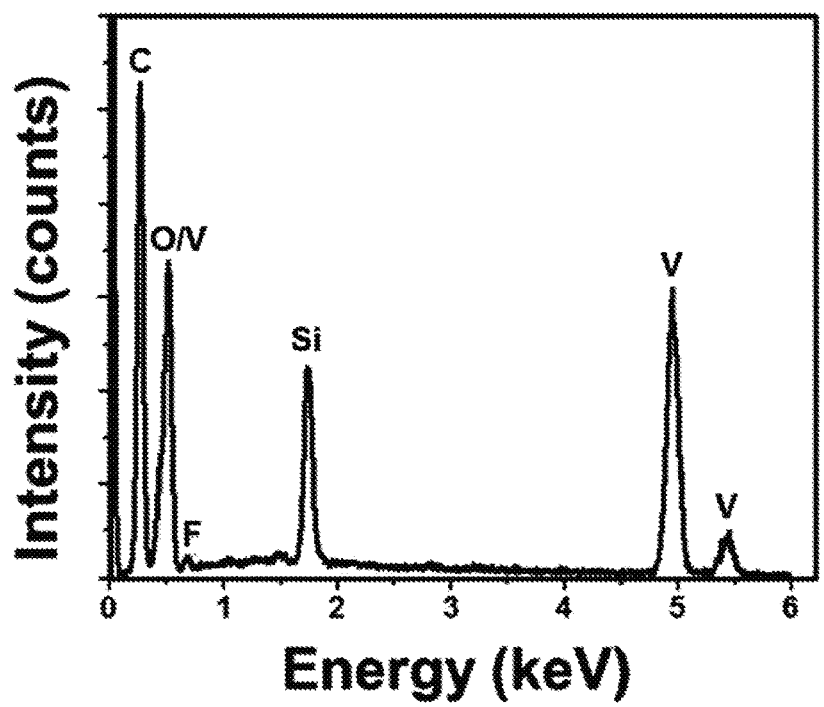
FIG. 10C is an EDX spectrum acquired for $VO_2@$-F nanocrystals in accordance with an embodiment of the disclosure.

Energy dispersive X-ray (EDX) maps were obtained using a JEOL JSM-7500F scanning electron microscope operated at an acceleration voltage of 15 kV with an emission current of 10 μA and a probe current of 12 μA. FIGS. 4C and 10C depict EDX spectrum acquired after functionalization indicating the presence of Si and F on the nanocrystal surfaces.

Example 6: Polymer Nanocomposites

In order to prepare nanocomposites, $VO_2$ nanocrystals were homogenously dispersed within a methacrylic acid/ethyl acrylate copolymer (Acrysol ASE-60, a commercially available high-shear viscosity thickener obtained from Dow Chemical). Dispersions of $VO_2$, $VO_2$@$SiO_2$, $VO_2$@-F, and $VO_2$@$SiO_2$—F nanocrystals were prepared in the following manner. Briefly, ca. 3 mg of nanocrystals were dispersed by ultrasonication for 5 min in 9.67 mL of deionized water with pH adjusted to ca. 11.5 by the addition of 2-amino-2-methyl-1-propanol containing 5% added water (Amresco). As-prepared $VO_2$ and $VO_2$@$SiO_2$ were dispersed in water after synthesis without further processing, whereas $VO_2$@-F, and $VO_2$@$SiO_2$—F nanocrystals were dispersed in water with the help of PFOS as outlined above. Next, the colloidal aqueous dispersion was stirred using a magnetic stir plate and 0.33 mL of the methacrylic acid/ethyl acrylate copolymer solution in water was introduced to obtain a 1 wt % final concentration of the polymer (the solid content was ca. 28%). Care was taken to avoid foaming and vortex formation in the vial. The alkaline pH induced thickening of the solution; the stirring speed was successively increased to ensure homogeneous dispersion of the nanocrystals. The dispersion was stirred was for at least 20 min after it turned clear (from the initial milky white appearance).

In addition to methacrylic acid/ethyl acrylate copolymer, polyacrylate and hydroxyethylcellulose (Rheolate-1 obtained from Elementis Specialties and Natrosol B obtained from Ashland, respectively) matrices were also prepared. The polyacrylate dispersions had a low viscosity and did not yield high-quality optical thin films; hydroxyethylcellulose dispersions could be cast into high-quality homogeneous thin films; however, the optical transmittance of the cellulosic matrix was substantially lower than methacrylic acid/ethyl acrylate copolymer and thus only the latter is discussed in subsequent sections. Several phosphate ester surfactants (Dextrol™ and Strodex™ from Ashland Chemicals) were further examined for their ability to facilitate dispersion of the nanocrystals in the methacrylic acid/ethyl acrylate copolymer aqueous dispersion but yielded only marginal improvements in the stability of the dispersions and did not substantially enhance the optical performance of the obtained thin films. Subsequent sections thus focus on studies of $VO_2$ or $VO_2$@$SiO_2$ nanocrystals dispersed within the methacrylic acid/ethyl acrylate copolymer matrix without the use of any additional surfactants and $VO_2$@-F and $VO_2$@ $SiO_2$—F nanocrystals dispersed with the help of PFOS.

A methacrylic acid/ethyl acrylate copolymer matrix has been selected as the host. It has a high degree of optical transparency in the visible region of the electromagnetic spectrum and exhibits a pH tunable viscosity that allows for casting of uniform thin films from aqueous solution. The polymer is added to the $VO_2$@$SiO_2$, $VO_2$@-F/PFOS, or $VO_2$@$SiO_2$—F colloidal dispersions at acidic pH. Subsequently, the pH is increased by addition of 2-amino-2-methyl-1-propanol containing 5% added water causing deprotonation of methacrylic acid groups that take on an anionic charge. Charge repulsion between anionic groups induces swelling of the copolymer and disperses particles based on volume exclusion. The swelling is clearly discernible by the transition of milky white color of the polymer to a highly transparent appearance and by a pronounced increase in the viscosity of the solution, which results from expansion of the polymer. This matrix allows for homogeneous dispersion of 1-16 mg/mL of functionalized $VO_2$@$SiO_2$ nanocrystals. FIGS. 12A-12D are images of transparent thin films embedded with $VO_2$ nanocrystals prepared by this method.

Example 7: Nanocomposite Film Preparation

Films were cast on 2.5×7.5 cm borosilicate glass microscope slides that were cleaned with 200 proof ethanol and low-lint wipes prior to casting. Evaluation of film thicknesses was carried out with a Bruker Dimension Icon atomic force microscope operating in tapping mode.

Films contained a range of $VO_2$, $VO_2$@$SiO_2$, $VO_2$@-F, and $VO_2$@$SiO_2$—F nanocrystal loadings (for 2-16 mg of $VO_2$ nanocrystals in 10 mL of the methacrylic acid/ethyl acrylate copolymer aqueous dispersion). Films were cast onto glass substrates by drawing out ca. 2.0 mL of the dispersion into a syringe. The previously described borosilicate glass substrate was then placed on an even surface. The dispersion was then placed along a straight line down the center of the borosilicate glass substrate. A casting knife from BY K Wesel, Germany set at a wet thickness of 1 mm was drawn across the substrate. The film was then allowed to cure overnight at room temperature under ambient conditions. After curing, the average dry film thickness was ca. 1-2 μm.

Example 8: FTIR Characterization of Nanocomposite Films

Optical characterization of the thin films was performed using a multi-wavelength Bruker Vertex-70 FTIR spectrometer equipped with a Pike Technologies temperature stage in the spectral range between 400 nm and 2500 nm. The samples were allowed to equilibrate for 10 minutes at each temperature prior to recording a spectrum. A change in beam splitter distorts the spectra between 1180 nm and 1250 nm and this region is thus omitted from the spectral profiles. In order to determine optical modulation attributed to $VO_2$ nanocrystals alone, a spectrum of a borosilicate glass substrate coated with unmodified methacrylic acid/ethyl acrylate copolymer was recorded and the spectra were corrected in each instance.

Figure 9:
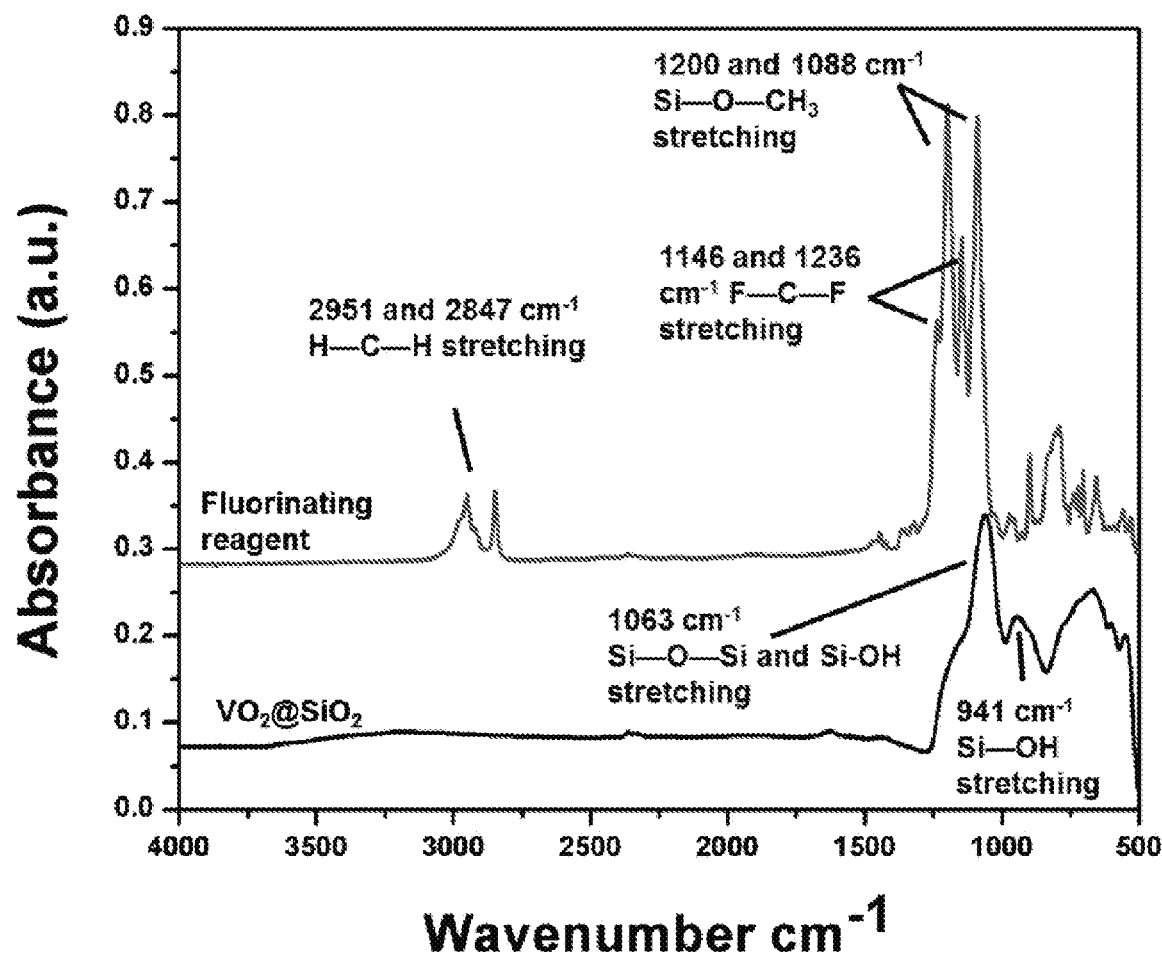
FIG. 9 is an FTIR spectra of the fluorinating reagent (heptadecafluoro-1,1,2,2-tetrahydrodecyl)trimethoxysilane) and core-shell $VO_2@SiO_2$ in accordance with an embodiment of the disclosure. The spectrum for $VO_2@SiO_2$ is characterized by infrared-active modes at 1063 $cm^{-1}$ and 941 $cm^{-1}$ that correspond to Si—O—Si and Si—OH stretches, respectively.
Figure 10D:
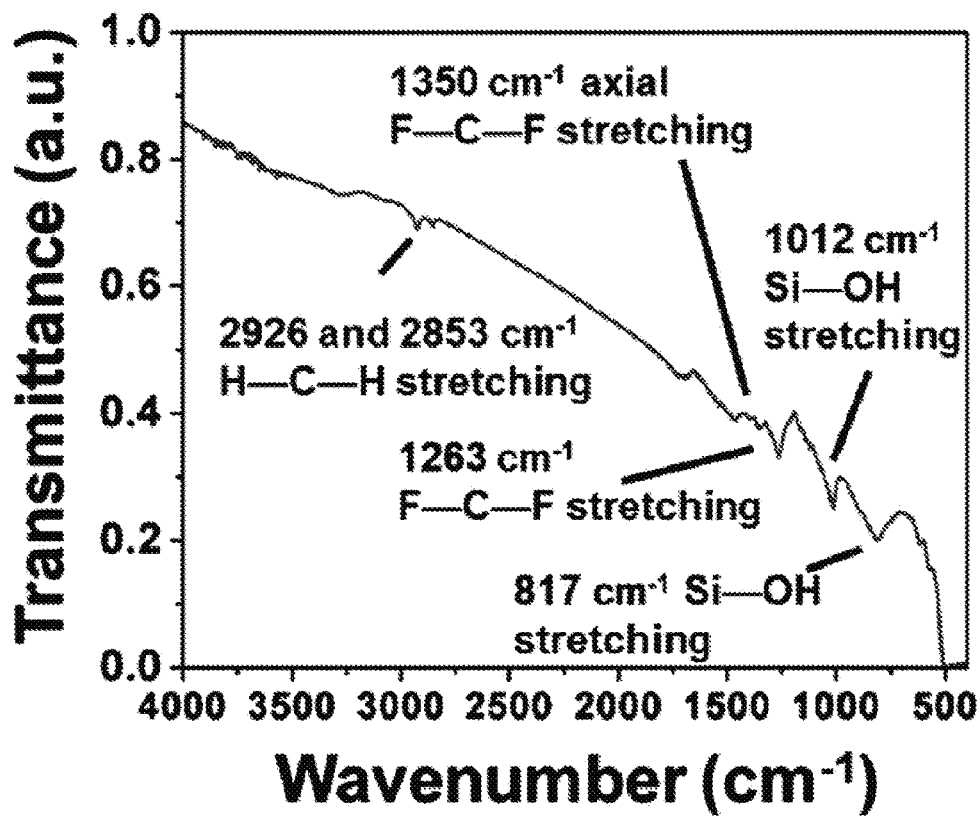
FIG. 10D is an FTIR ATR spectrum of $VO_2$ nanowires functionalized with trimethoxy(1H,1H,2H,2H-perfluorooctyl)silane in accordance with an embodiment of the disclosure showing characteristic modes of the perfluorinated moieties as assigned in the discussion.

The FTIR spectra are characterized by features at 2924 $cm^{-1}$ and 2853 $cm^{-1}$, which are ascribed to methylene H—C—H asymmetric and symmetric stretching modes, respectively. The values indicate a high degree of ordering of the $CH_2$ domains of the fluorinated monolayer and infers that the siloxanes are bonded in close proximity to one another on the $VO_2$ nanocrystal surfaces. Dangling Si—OH bonds are also discernible at 1013 $cm^{-1}$. Further evidence for the presence of the fluorinated self-assembled monolayer on the nanocrystals is derived from the peak at 1263 $cm^{-1}$, which is characteristic of Si—$CH_2$ stretching arising from the methylene segment of the monolayer. A feature observed at 1113 $cm^{-1}$ can be attributed to Si—O—Si stretching from cross-linked siloxanes formed at the nanocrystal surface. A large number of features are present in the region between 1400 $cm^{-1}$ and 1100 $cm^{-1}$, especially a strong peak at 1263 $cm^{-1}$; these features are attributed to F—C—F stretches. The poor resolution of individual peaks in this region is attributed to the presence of multiple rotational isomers of fluoroalkyl chains; however, a peak at 1350 $cm^{-1}$ is fairly well resolved and is specifically attributed to axial $CF_2$ stretching. The distinctive feature observed for this vibrational mode is characteristic of fluoroalkyl chains configured into a helical-tilt orientation as observed previously for fluoroalkyl self-assembled monolayers. Parallel C—F stretching relative to the helical axis results in the change of dipole necessary for observation of this peak. See, e.g., FIG. 10D. Furthermore, peaks at 1088 $cm^{-1}$ and 1200 $cm^{-1}$ that represent Si—O—$CH_3$ stretching in the silane precursor are no longer observed for the functionalized product corroborating the hydrolysis of the methoxysilane groups (FIG. 9). The FTIR data thus suggest that the silanes form close-pack ordered arrays on the surfaces of the $VO_2$ nanocrystals. These arrays can substantially mitigate agglomeration of the nanocrystals and allow for casting of homogeneous optically transparent thin films. Surface functionalization renders the nanocrystals hydrophobic and facilitates dispersion in a perfluorinated solvent.

Figure 5B:
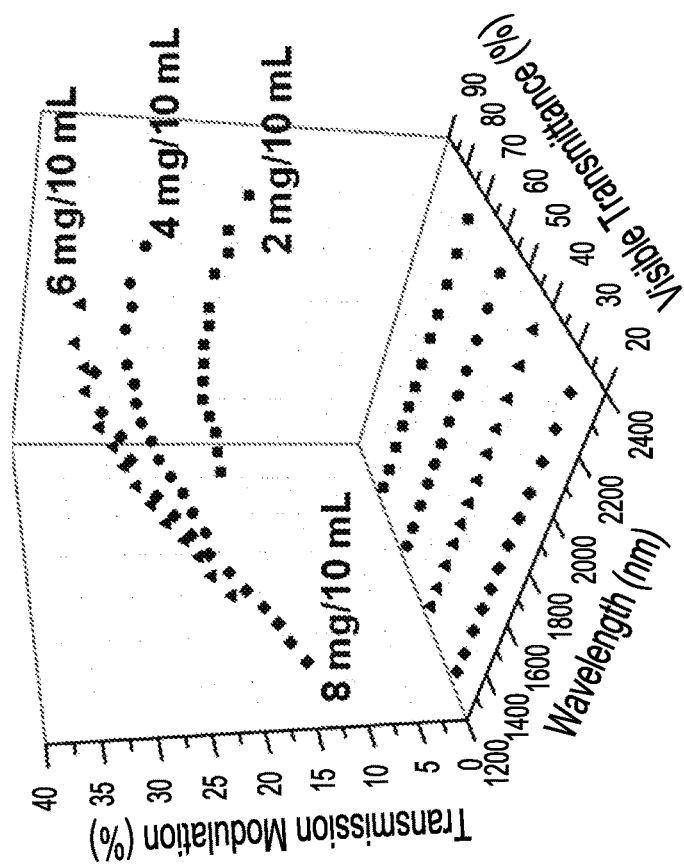
FIG. 5B is a three-dimensional (3D) representation of $VO_2$ optical data plots showing four nanocrystal loadings of the nanocrystals of FIG. 5A in accordance with embodiments of the disclosure: 2 mg (squares), 4 mg (circles), 6 mg (triangles), 8 mg (diamonds)
Figure 5A:
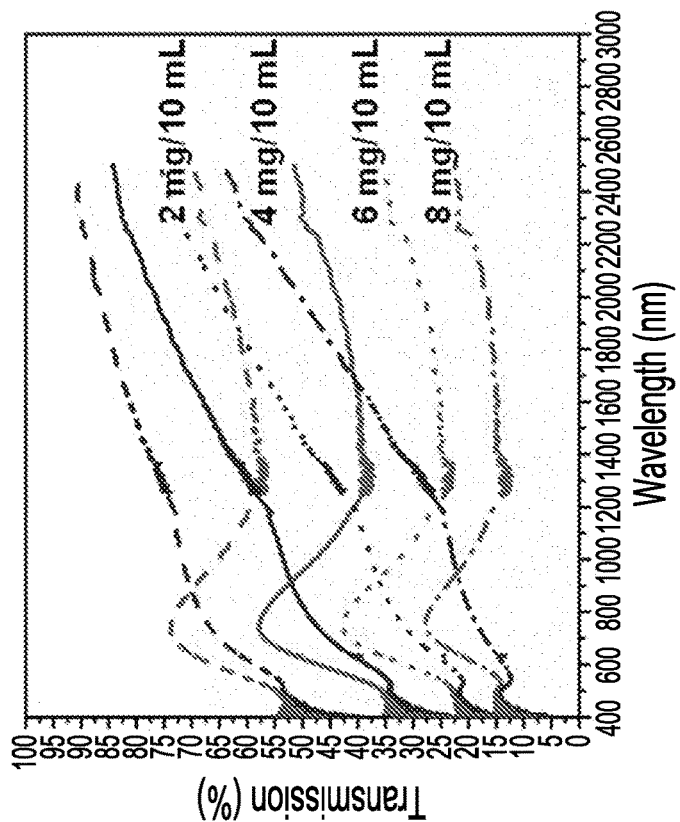
FIG. 5A illustrates absorption spectra acquired for four different loadings of $VO_2$ nanocrystals in accordance with an embodiment of the disclosure. The plots correspond to 2 mg (dashed lines), 4 mg (solid lines), 6 mg (dotted lines), and 8 mg (alternating dash-dot lines) dispersed in 10 mL of an aqueous dispersion of 1 wt % (relative to 10 mL volume of water) methacrylic acid/ethyl acrylate copolymer cast onto borosilicate glass. Spectra obtained at 30° C. are displayed in black, whereas spectra obtained at 85° C. after equilibration for 10 min are shown in gray.
Figure 6B:
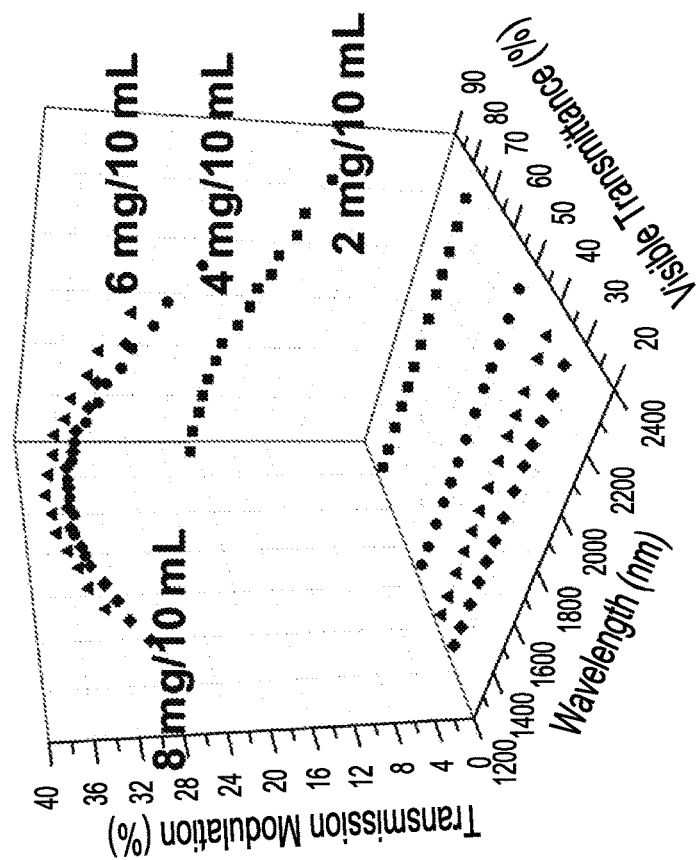
FIG. 6B is a 3D representation of $VO_2$ optical data plots showing four $VO_2@$-F nanocrystal loadings of the nanocrystals of FIG. 6A in accordance with an embodiment of the disclosure: 2 mg (squares), 4 mg (circles), 6 mg (triangles), and 8 mg (diamonds)
Figure 6A:
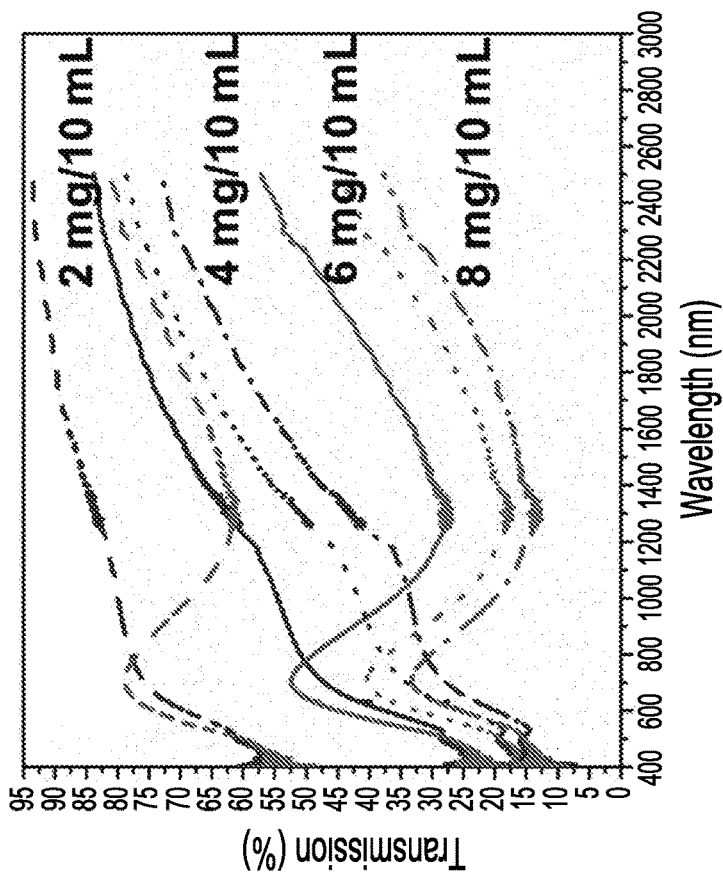
FIG. 6A illustrates absorption spectra acquired for four different loadings of $VO_2@$-F nanocrystals in accordance with an embodiment of the disclosure. The plots correspond to 2 mg (dashed lines), 4 mg (solid lines), 6 mg (dotted lines), and 8 mg (alternating dash-dot lines) dispersed in 10 mL of an aqueous dispersion of 1 wt % (relative to 10 mL water) methacrylic acid/ethyl acrylate copolymer cast onto borosilicate glass. Spectra obtained at 30° C. are displayed in black, whereas spectra obtained at 85° C. after equilibration for 10 min are shown in gray.

Example 9: Temperature-dependent Modulation of Transmission of Near-Infrared Light FIGS. 5A and 5B show the temperature-dependent UV-visible-NIR absorption spectrum acquired for as-prepared $VO_2$ nanocrystals dispersed in the methacrylic acid/ethyl acrylate copolymer matrix at different $VO_2$ loadings and cast onto borosilicate glass. With increasing temperature, the insulator-metal transition induces a pronounced change of optical transmittance. Metallization strongly decreases the transmittance as a result of the increased reflectivity of the metallic $VO_2$ nanocrystals. The pronounced modulation of NIR light transmittance as a function of the ambient temperature observed here is what makes this material attractive as a fenestration element. In order to improve energy reflection efficiency, a comparison of several different metrics is important, (a) the visible light transmittance (a fenestration element that is overly dark will be of limited utility); (b) the extent of NIR modulation, which reflects the efficacy of the element in modulating solar heat gain without impacting visible transparency; and (c) the onset of NIR modulation. The last mentioned parameter is of high importance for energy efficiency. An early onset of NIR modulation in the 770-800 nm regime allows for the considerable solar flux in the low-wavelength NIR to be reflected at high temperatures. However, this part of the spectrum is also characterized by a scattering background, which can diminish the NIR modulation. Scattering thus induces a red-shift of the NIR modulation to higher wavelengths, where there is less solar flux, substantially degrading the benefits of dynamic modulation. FIG. 5B indicates that for the 2 mg/mL dispersion, NIR modulation of 24% is obtained at a visible light transmittance of ca. 74% and the onset of NIR modulation occurs at 883 nm. A pronounced divergence of the black (30° C.) and gray (85° C.) plots is only observed beyond 1300 nm (TABLE 1). Increasing the active particle loading to 4 mg/10 mL increases the maximum NIR modulation to 33.7%; however, the visible light transmittance is diminished to 58% and the onset of NIR modulation is red-shifted to 914 nm. Further increasing the nanocrystal loading to 6 mg/10 mL increases the NIR modulation to ca. 40% but further decreases the visible light transmittance to 42.8% and red-shifts the onset of NIR modulation to 926 nm, suggesting increasing agglomeration (and thereby a stronger scattering background). Increasing the nanocrystal loading to still higher values diminishes the visible light transmittance without much of an increase of the NIR modulation. The spectral shapes discernible in FIG. 5 suggest pronounced light scattering in these latter samples with the 30° C. and 85° C. spectra diverging only at wavelengths >1300-1400 nm. This scattering background results from the strong agglomeration of the nanocrystals within the films in the absence of a method of dispersion. Indeed, FIGS. 13A and 13B plot percent transmission and transmission modulation, respectively, of still higher nanocrystal loadings and the relevant metrics are listed in TABLE 2. More severe agglomeration is evidenced with a concomitant decrease of both the NIR modulation and the visible light transmittance; the onset of modulation is shifted to 978 nm for the 12 mg/10 mL dispersion.

TABLE 1

Summary of maximum NIR modulation, transmission in the visible region, and onset of NIR modulation for bare $VO_2$, $VO_2@SiO_2$, $VO_2@$—F, and $VO_2@SiO_2$—F nanocrystals dispersed at various loadings in a methacrylic acid/ethyl acrylate matrix. Data for higher loading masses are listed in Tables 2-5.

| Sample | Maximum NIR Modulation (%) | Maximum Transmittance in the Visible Spectrum (%) | Onset of NIR Modulation (nm) |
| --- | --- | --- | --- |
| $VO_2$ | | | |
| 2 mg | 23.8 | 73.9 | 883 |
| 4 mg | 33.7 | 57.9 | 914 |
| 6 mg | 40.4 | 42.8 | 926 |
| 8 mg | 41.9 | 27.8 | 926 |
| $VO_2@$—F | | | |
| 2 mg | 23.3 | 78.9 | 780 |
| 4 mg | 38.2 | 52.4 | 775 |
| 6 mg | 41.0 | 40.4 | 789 |
| 8 mg | 40.1 | 33.3 | 789 |
| $VO_2@SiO_2$ | | | |
| 2 mg | 24.4 | 77.6 | 812 |
| 4 mg | 39.9 | 54.0 | 810 |
| 6 mg | 47.2 | 38.4 | 788 |
| 8 mg | 46.4 | 29.7 | 804 |

TABLE 1-continued

Summary of maximum NIR modulation, transmission in the visible region, and onset of NIR modulation for bare $VO_2$, $VO_2$@$SiO_2$, $VO_2$@—F, and $VO_2$@$SiO_2$—F nanocrystals dispersed at various loadings in a methacrylic acid/ethyl acrylate matrix. Data for higher loading masses are listed in Tables 2-5.

| Sample | Maximum NIR Modulation (%) | Maximum Transmittance in the Visible Spectrum (%) | Onset of NIR Modulation (nm) |
|---|---|---|---|
| $VO_2$@$SiO_2$—F | | | |
| 2 mg | 12.4 | 87.5 | 809 |
| 4 mg | 30.2 | 61.8 | 758 |
| 6 mg | 42.1 | 45.2 | 796 |
| 8 mg | 32.3 | 46.2 | 776 |

TABLE 2

Summary of maximum NIR modulation, transmission in the visible region, and onset of NIR modulation for each of the three nanocrystal loadings in FIGS. 13A and 13B.

| Sample: $VO_2$ | Maximum NIR Modulation (%) | Maximum Transmittance in the Visible Spectrum (%) | Onset of NIR Modulation (nm) |
|---|---|---|---|
| 10 mg | 37.5 | 21.2 | 958 |
| 12 mg | 35.7 | 18.4 | 978 |
| 16 mg | 31.9 | 14.1 | 832 |

As can be seen in TABLE 1, the primary enhancement of function afforded by surface functionalization combined with the use of a dispersant is an earlier onset of NIR modulation as compared to unfunctionalized as-prepared $VO_2$. The modulation of NIR and visible light transmittance of $VO_2$ and $VO_2$@-F nanocrystals are similar (TABLE 1); however, FIGS. 6A and 6B and TABLE 1 illustrate that functionalization of the $VO_2$ nanocrystals with (heptadecafluoro-1,1,2,2-tetrahydrodecyl)trimethoxysilane followed by dispersion with PFOS brings about a strong blue-shift of the onset of modulation; the spectral lineshapes are starkly altered as a result of the better dispersion of the nanocrystals, which strongly suppresses the scattering background. Two distinct advantages are realized as a result of this spectral shift: (i) more solar flux in the NIR is reflected upon metallization at high temperatures and (ii) the region of maximum NIR modulation is shifted nearer to the highest solar flux part of the spectrum. It can be seen from the 3D graphs in FIG. 5 for bare $VO_2$ nanocrystals, maximal modulation is not reached until ca. 2400-2500 nm (depending on the extent of loading); however, for perfluorinated $VO_2$ nanocrystals dispersed using PFOS (FIGS. 6A and 6B), the maximum modulation is achieved near 1600-1700 nm.

The substantially improved dispersion of $VO_2$@-F nanocrystals is furthermore evidenced by the relative constancy of the onset of NIR modulation with increasing nanocrystal loading (TABLE 1). FIGS. 14A and 14B and TABLE 3 provide data on higher nanocrystal loadings. Interestingly, the better dispersion results in preservation of the extent of NIR modulation even at high concentrations although some agglomeration is evidenced in the red-shift of the onset of NIR modulation. These compositions provide high NIR modulation but low visible-light transmittance performance that might be suitable for some applications wherein tinting and dynamic fenestration are desired at the same time.

TABLE 3

Summary of maximum NIR modulation, transmission in the visible region, and onset of NIR modulation for each of the three nanocrystal loadings in FIGS. 14A and 14B.

| Sample: $VO_2$@—F | Maximum NIR Modulation (%) | Maximum Transmittance in the Visible Spectrum (%) | Onset of NIR Modulation (nm) |
|---|---|---|---|
| 10 mg | 38.6 | 27.4 | 835 |
| 12 mg | 40.2 | 16.4 | 827 |
| 16 mg | 35.1 | 15.6 | 845 |

Figure 7B:
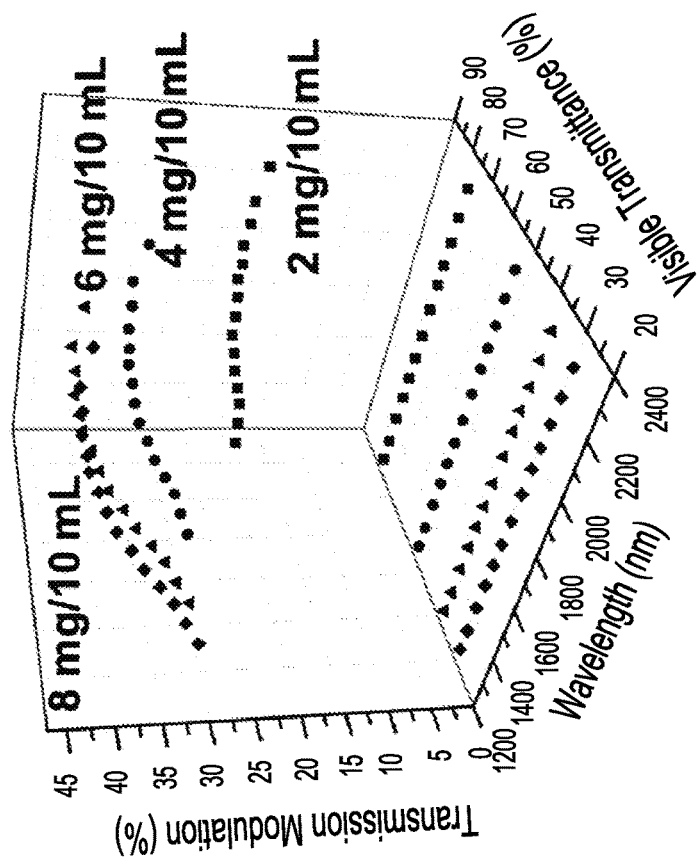
FIG. 7B is a 3D representation of $VO_2$ optical data plots showing 4 $VO_2@SiO_2$ nanocrystal loadings of the nanocrystals of FIG. 7A in accordance with an embodiment of the disclosure: 2 mg (squares), 4 mg (circles), 6 mg (triangles), and 8 mg (diamonds) in accordance with an embodiment of the disclosure.
Figure 7A:
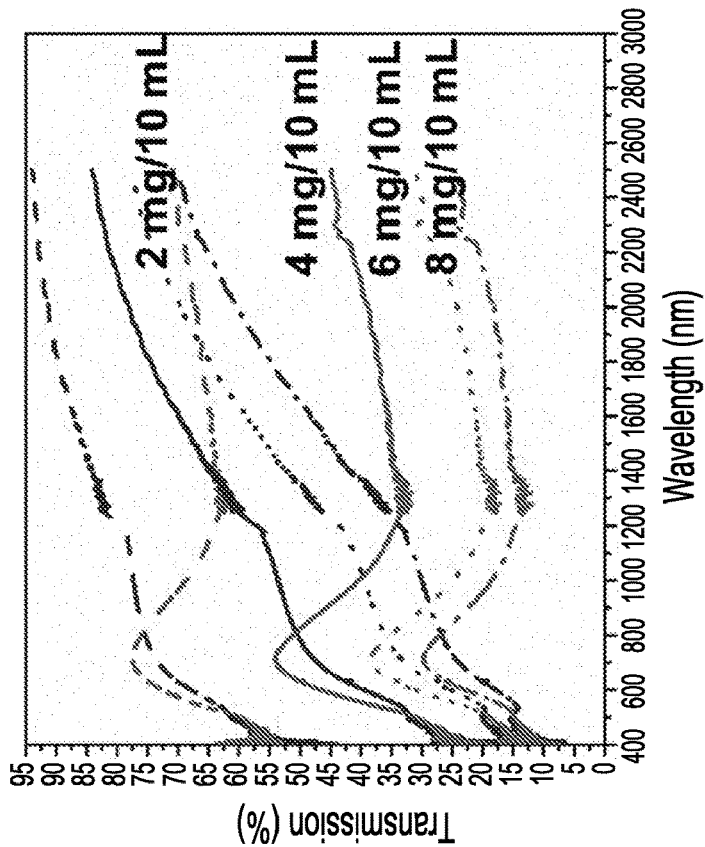
FIG. 7A illustrates absorption spectra acquired for four different loadings of $VO_2@SiO_2$ nanocrystals in accordance with embodiments of the disclosure. The plots correspond to 2 mg (dashed lines), 4 mg (solid lines), 6 mg (dotted lines), and 8 mg (alternating dash-dot lines) dispersed in 10 mL of an aqueous dispersion of 1 wt % (relative to 10 mL water) methacrylic acid/ethyl acrylate copolymer cast onto borosilicate glass. Spectra obtained at 30° C. are displayed in black, whereas spectra obtained at 85° C. after equilibration for 10 min are shown in gray.

FIGS. 7A and 7B plot the temperature-dependent optical characteristics of $VO_2$@$SiO_2$ nanocrystals. As also listed in TABLE 1, the increased dispersion afforded by the $SiO_2$ shells results in a higher NIR modulation that approaches as much as 47%. However, the onsets of NIR modulation, while being substantially improved over bare $VO_2$ nanocrystals, are somewhat red-shifted from the $VO_2$@-F nanocrystals. As with the $VO_2$@-F nanocrystals, the pronounced NIR modulation is preserved even at higher loadings when the visible light transmission is diminished (FIGS. 15A and 15B and TABLE 4). The slightly greater degree of agglomeration observed for $VO_2$@$SiO_2$ is attributed to the $SiO_2$ shells encapsulating multiple $VO_2$ nanocrystals; in contrast, based on FTIR data (FIG. 4), the perfluorinated self-assembled monolayers allow for individual dispersion of the nanocrystals within the polymeric matrix.

TABLE 4

Summary of maximum NIR modulation, transmission in the visible region, and onset of NIR modulation for each of the three nanocrystal loadings in FIGS. 15A and 15B.

| Sample: $VO_2$@$SiO_2$ | Maximum NIR Modulation (%) | Maximum Transmittance in the Visible Spectrum (%) | Onset of NIR Modulation (nm) |
|---|---|---|---|
| 10 mg | 45.7 | 24.6 | 805 |
| 12 mg | 47.0 | 19.8 | 786 |
| 16 mg | 31.9 | 14.1 | 832 |

Figure 8B:
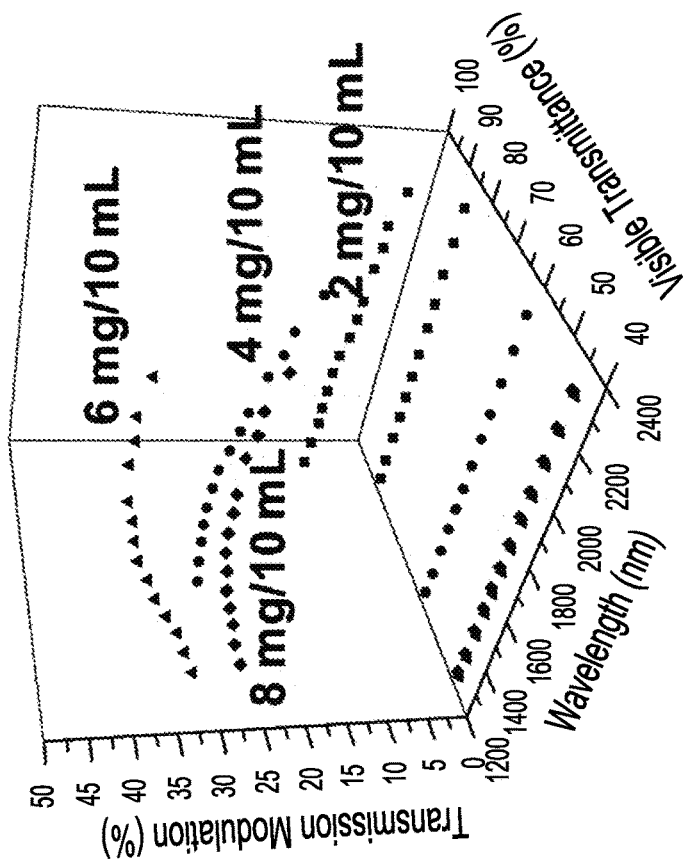
FIG. 8B is a 3D representation of $VO_2$ optical data plots showing 4 $VO_2@SiO_2$—F nanocrystal loadings of the nanocrystals of FIG. 8A in accordance with an embodiment of the disclosure: 2 mg (squares), 4 mg (circles), 6 mg (triangles), 8 mg (diamonds) in accordance with an embodiment of the disclosure.
Figure 8A:
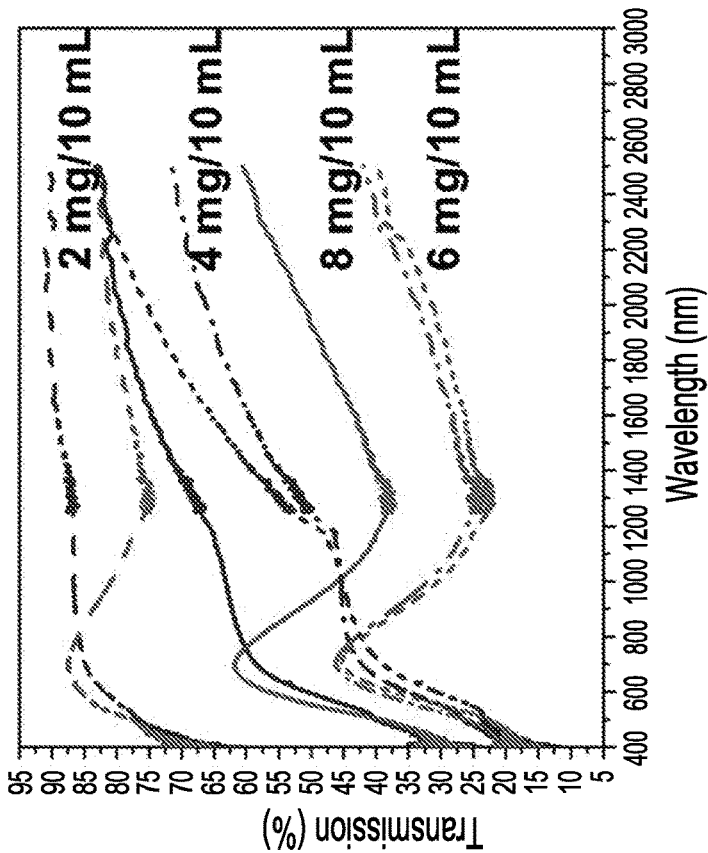
FIG. 8A. illustrates absorption spectra acquired for four different loadings of $VO_2@SiO_2$—F nanocrystals in accordance with an embodiment of the disclosure. The plots correspond to 2 mg (dashed lines), 4 mg (solid lines), 6 mg (dotted lines), and 8 mg (alternating dash-dot lines) dispersed in 10 mL of an aqueous dispersion of 1 wt % (relative to 10 mL water) methacrylic acid/ethyl acrylate cast onto borosilicate glass. Spectra obtained at 30° C. are displayed in black, whereas spectra obtained at 85° C. after equilibration for 10 min are shown in gray.

A combination of both dispersion methods has also been shown by silane functionalization of $VO_2$@$SiO_2$ nanocrystals to obtain $VO_2$@$SiO_2$—F nanocrystals. FIGS. 8A and 8B and TABLE 1 indicate that this set of samples yields high NIR modulation of above 45% comparable to $VO_2$@$SiO_2$ samples and the onset of NIR modulation is further blue-shifted. In these samples, the $VO_2$ nanocrystals with dimensions of 44±30 nm are protected by low-dielectric-constant $SiO_2$ shells, which in turn are encapsulated with perfluorinated self-assembled monolayers. The core—shell nanocrystals are homogeneously dispersed within the methacrylic acid/ethyl acrylate copolymer matrix with the help of PFOS allowing for thin films exhibiting large NIR modulation with onsets in the 760-800 nm regime. Furthermore, substantial enhancements of visible light transmittance are observed and the lineshapes in FIGS. 8A and 8B indicate that the scattering background is strongly suppressed. Higher loadings of $VO_2$@$SiO_2$—F nanocrystals are presented in FIGS. 16A and 16B and TABLE 5. The low scattering background and strong NIR modulation is preserved even at higher loadings attesting to the excellent dispersion of the $VO_2$ nanocrystals.

TABLE 5

Summary of maximum NIR modulation, transmission in the visible region, and onset of NIR modulation for each of the nanocrystal loadings in FIGS. 16 A and 16B.

| Sample: VO$_2$@SiO$_2$—F | Maximum NIR Modulation (%) | Maximum Transmittance in the Visible Spectrum (%) | Onset of NIR Modulation (nm) |
|---|---|---|---|
| 10 mg | 34.1 | 37.5 | 720 |
| 12 mg | 28.2 | 24.7 | 858 |
| 16 mg | 32.3 | 20.8 | 722 |

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed. The term "about" means plus or minus 5% of the stated value.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of making a crystalline vanadium oxide nanomaterial dispersed in a polymeric matrix comprising:
   hydrothermally annealing amorphous vanadium oxide to provide a crystalline vanadium oxide nanomaterial;
   encapsulating the crystalline vanadium oxide nanomaterial with a passivating layer; and
   dispersing the coated crystalline vanadium oxide nanomaterial in the polymeric matrix.

2. The method of claim 1, wherein the passivating layer comprises an amorphous or crystalline matrix chosen from an oxide, sulfide, oxyhydroxide, hydroxide, oxyhalide, carbide, selenide, and combinations thereof.

3. The method of claim 1, further comprising grafting a silane to the passivating layer.

4. The method of claim 1, wherein coating the crystalline vanadium oxide nanomaterial with a passivating layer comprises grafting a silane to a surface of the crystalline vanadium oxide nanomaterial.

5. The method of claim 1, wherein hydrothermally annealing the amorphous vanadium oxide does not include any organic solvents.

6. The method of claim 1, wherein hydrothermally annealing the amorphous vanadium oxide is performed at a pressure of between about 70 pounds per square inch (p.s.i.) and about 5,000 p.s.i.

7. The method of claim 1, wherein hydrothermally annealing amorphous vanadium oxide includes heating a vanadium oxide compound, at a temperature of between about 100° C. and 300° C.

8. The method of claim 1, wherein dispersing the coated crystalline vanadium oxide nanomaterial in a polymeric matrix comprises:
   dispersing the coated crystalline vanadium oxide nanomaterial in an aqueous polymeric dispersion; and
   curing the aqueous polymeric dispersion to provide the polymeric matrix.

9. The method of claim 1, further comprising forming the crystalline vanadium oxide nanomaterial dispersed in a polymeric matrix into a film disposed on a surface.

10. A composition comprising:
    a polymeric matrix; and
    a crystalline vanadium oxide nanomaterial comprising:
       a crystalline vanadium oxide core; and
       a passivating layer encapsulating the crystalline vanadium oxide core,
    wherein the crystalline vanadium oxide nanomaterial is dispersed in the polymeric matrix.

11. The composition of claim 10 wherein the passivating layer comprises an amorphous or crystalline matrix chosen from an oxide, sulfide, oxyhydroxide, hydroxide, oxyhalide, carbide, selenide, and combinations thereof.

12. The composition according to claim 11, wherein the amorphous matrix comprises a material chosen from silicon oxide, titanium oxide, vanadium oxide, zinc oxide, hafnium oxide, zirconium oxide, aluminum oxide, cerium oxide, molybdenum oxide, and combinations thereof.

13. The composition of claim 10, further comprising a silane layer grafted to the passivating layer.

14. The composition of claim 10, wherein the passivating layer comprises a silane layer grafted to a surface of the crystalline vanadium oxide core.

15. The composition of claim 10, wherein the polymeric matrix comprises a polymeric material chosen from a cellulosic polymer, a polycarbonate, a polyimide, a polyurethane, polyvinylidene fluoride, polyethylene terephthalate, and an acrylic acid/acrylate copolymer.

16. The composition of claim 10, wherein the polymeric matrix has a viscosity of between about 5 mPa*s and about 15 mPa*s.

17. The composition of claim 10, wherein the polymeric matrix has an optical transmittance of between about 10% and about 90% in the visible range.

18. The composition of claim 10, wherein the polymeric matrix further comprises a surfactant configured to aid in dispersing the crystalline vanadium oxide nanomaterial.

19. The composition of claim 18, wherein the surfactant is a perfluorinated surfactant.

20. The composition of claim 10, wherein a weight: weight ratio of crystalline vanadium oxide nanomaterial to surfactant is between about 10:1 and about 0.1:1.

21. The composition of claim 10, wherein the crystalline vanadium oxide nanomaterial is a nanomaterial chosen from a nanoparticle, a nanowire, a nanorod, a nanosphere, a nanostar, and combinations thereof.

22. The composition of claim 10, wherein the crystalline vanadium oxide nanomaterial has an insulator-metal electronic transition at a temperature between about −20° C. and about 100° C.

23. The composition of claim 10, wherein the insulator-metal electronic transition is accompanied by a modulation of near-infrared light transmittance.

24. The composition of claim 23, wherein the modulation of near-infrared light transmittance between about 750 nm and about 2,500 nm is greater than about 10%.

25. The composition of claim 23, wherein an onset of near-infrared light transmittance modulation occurs between about 750 nm and about 950 nm.

26. The composition of claim 10, wherein a dried weight: weight ratio of crystalline vanadium oxide nanomaterial to polymeric matrix is between about 0.001 to about 0.05.

27. A substrate having a surface, wherein the surface comprises a film comprising:
  a polymeric matrix; and
  a crystalline vanadium oxide nanomaterial comprising:
    a crystalline vanadium oxide core; and
    a passivating layer encapsulating the crystalline vanadium oxide core,
  wherein the crystalline vanadium oxide nanomaterial is dispersed in the polymeric matrix.

28. The substrate of claim 27, wherein the substrate is part of a fenestration element.

29. The substrate of claim 28, wherein the fenestration element is chosen from a window unit, an insulating glass unit, a skylight, a glazed door, and automotive lamination.

30. The substrate of claim 27, wherein the film has a thickness of between about 10 nm and about 50 microns.

31. The substrate of claim 27, wherein the substrate is glass, silicon oxide, sapphire, alumina, polymer, plastic, or indium tin oxide-coated glass.

32. The substrate of claim 27, wherein visible light transmittance of the film is between about 0% and about 90%.

\* \* \* \* \*